US006881094B2

(12) United States Patent
Magyar et al.

(10) Patent No.: US 6,881,094 B2
(45) Date of Patent: Apr. 19, 2005

(54) INTEGRATED ELECTRICAL RECEPTACLE SYSTEM FOR OUTDOOR APPLICATION

(75) Inventors: Robert P. Magyar, Furlong, PA (US); Matthew D. Marhefka, Richboro, PA (US)

(73) Assignee: Power Ease, L.L.C., Furlong, PA (US)

( * ) Notice: Subject to any disclaimer, the term of this patent is extended or adjusted under 35 U.S.C. 154(b) by 48 days.

(21) Appl. No.: 10/379,095

(22) Filed: Mar. 3, 2003

(65) Prior Publication Data

US 2003/0190838 A1 Oct. 9, 2003

Related U.S. Application Data

(63) Continuation-in-part of application No. 09/934,880, filed on Aug. 22, 2001, now Pat. No. 6,547,589, which is a continuation-in-part of application No. 09/679,576, filed on Oct. 5, 2000, now abandoned
(60) Provisional application No. 60/169,763, filed on Dec. 9, 1999.

(51) Int. Cl.[7] .............................................. H01R 13/60
(52) U.S. Cl. ..................................................... 439/535
(58) Field of Search ................................ 439/535, 544, 439/545, 562, 563, 564; 174/50, 65 R; 220/3.5

(56) References Cited

U.S. PATENT DOCUMENTS

| 1,836,408 | A | 12/1931 | Sutton |
| 2,532,990 | A | 12/1950 | Blaha |
| 2,900,814 | A | 8/1959 | Carson |
| 3,213,578 | A | 10/1965 | Cash |
| 3,236,545 | A | 2/1966 | Parkes et al. |
| 3,338,254 | A | 8/1967 | Regal |
| 3,818,656 | A | 6/1974 | Vigliotti |
| 3,824,524 | A | * | 7/1974 | Glover ........................ 439/282 |
| 4,065,020 | A | 12/1977 | Carson |

(Continued)

FOREIGN PATENT DOCUMENTS

| CH | 667485 A5 | 10/1988 |
| GB | 2 016 058 A | 9/1979 |

OTHER PUBLICATIONS

Six Page Brochure Entitled: "Kerr Lighting Outdoor Landscape Enhancement Lighting".

*Primary Examiner*—Truc T. Nguyen
*Assistant Examiner*—James R. Harvey
(74) *Attorney, Agent, or Firm*—Akin Gump Strauss Hauer & Feld, LLP

(57) ABSTRACT

The present invention is directed to a receptacle assembly for receiving and attaching to a support an electrical device connectable to an electrical conductor. The receptacle assembly has an enclosure, a first mount, and a second mount. The enclosure has a sidewall with an outer surface having a shape generally corresponding to a shape of an outer surface of a body formed by the intersection of a first cylinder eccentric to a second cylinder. The enclosure has a first opening for receiving the electrical device and a second opening for receiving the electrical conductor. The first mount is connected to the enclosure for attaching the receptacle assembly to the support. The second mount is connected to the enclosure for securing the electrical conductor to the enclosure.

17 Claims, 16 Drawing Sheets

U.S. PATENT DOCUMENTS

| | | |
|---|---|---|
| D249,559 S | 9/1978 | Blomqvist |
| 4,153,176 A | 5/1979 | Carson |
| 4,183,486 A | 1/1980 | Esoldi |
| 4,270,893 A | 6/1981 | Alieri |
| 4,291,816 A | 9/1981 | Lamoureux |
| 4,297,816 A | 11/1981 | Kella et al. |
| 4,304,957 A * | 12/1981 | Slater et al. ............... 174/65 R |
| 4,325,684 A | 4/1982 | Blackwood et al. |
| RE31,753 E | 12/1984 | LaVergne, Jr. |
| 4,693,438 A | 9/1987 | Angell |
| 4,711,974 A | 12/1987 | Borsh |
| 4,864,080 A | 9/1989 | Fochler et al. |
| 4,899,506 A | 2/1990 | Chapman et al. |
| 4,964,482 A | 10/1990 | Meyer |
| 4,966,794 A | 10/1990 | Hasegawa et al. |
| D315,026 S | 2/1991 | Castonguay et al. |
| 5,029,425 A | 7/1991 | Bogataj |
| 5,232,646 A | 8/1993 | Nasvik et al. |
| 5,277,853 A | 1/1994 | Allison et al. |
| 5,422,437 A * | 6/1995 | Schnell ..................... 174/65 R |
| 5,467,565 A | 11/1995 | Bowman et al. |
| 5,509,240 A | 4/1996 | Barton, Jr. |
| 5,543,186 A | 8/1996 | Andersen et al. |
| D377,229 S | 1/1997 | Shalvi |
| 5,603,424 A | 2/1997 | Bordwell et al. |
| 5,612,065 A | 3/1997 | Keller |
| D387,432 S | 12/1997 | Youssefian |
| D387,433 S | 12/1997 | Youssefian |
| 5,711,536 A | 1/1998 | Meyers |
| 5,738,921 A | 4/1998 | Andersen et al. |
| 5,744,753 A | 4/1998 | Nattel |
| 5,778,625 A | 7/1998 | Druffel et al. |
| 5,787,667 A | 8/1998 | Sheahan et al. |
| 5,803,594 A | 9/1998 | Fredrickson et al. |
| 5,813,188 A | 9/1998 | Behlen |
| 5,852,077 A | 12/1998 | Zawada et al. |
| 5,855,102 A | 1/1999 | Chang |
| 5,879,603 A | 3/1999 | Sievert |
| 5,887,401 A | 3/1999 | Moore, Jr. |
| 5,930,964 A | 8/1999 | Boehning |
| 5,943,827 A | 8/1999 | Okerlund |
| 5,984,719 A * | 11/1999 | Flegel ........................ 439/528 |
| 5,987,827 A | 11/1999 | Lord |
| 6,111,197 A | 8/2000 | Layne |
| 6,389,658 B1 | 5/2002 | Pfaller et al. |
| 6,521,831 B1 * | 2/2003 | Gretz ....................... 174/65 R |
| 6,547,589 B1 * | 4/2003 | Magyar et al. ............. 439/535 |
| D474,447 S * | 5/2003 | Kano ........................ D13/133 |
| D475,014 S * | 5/2003 | Kano ........................ D13/133 |
| 6,604,959 B1 * | 8/2003 | Martin et al. ............... 439/460 |

* cited by examiner

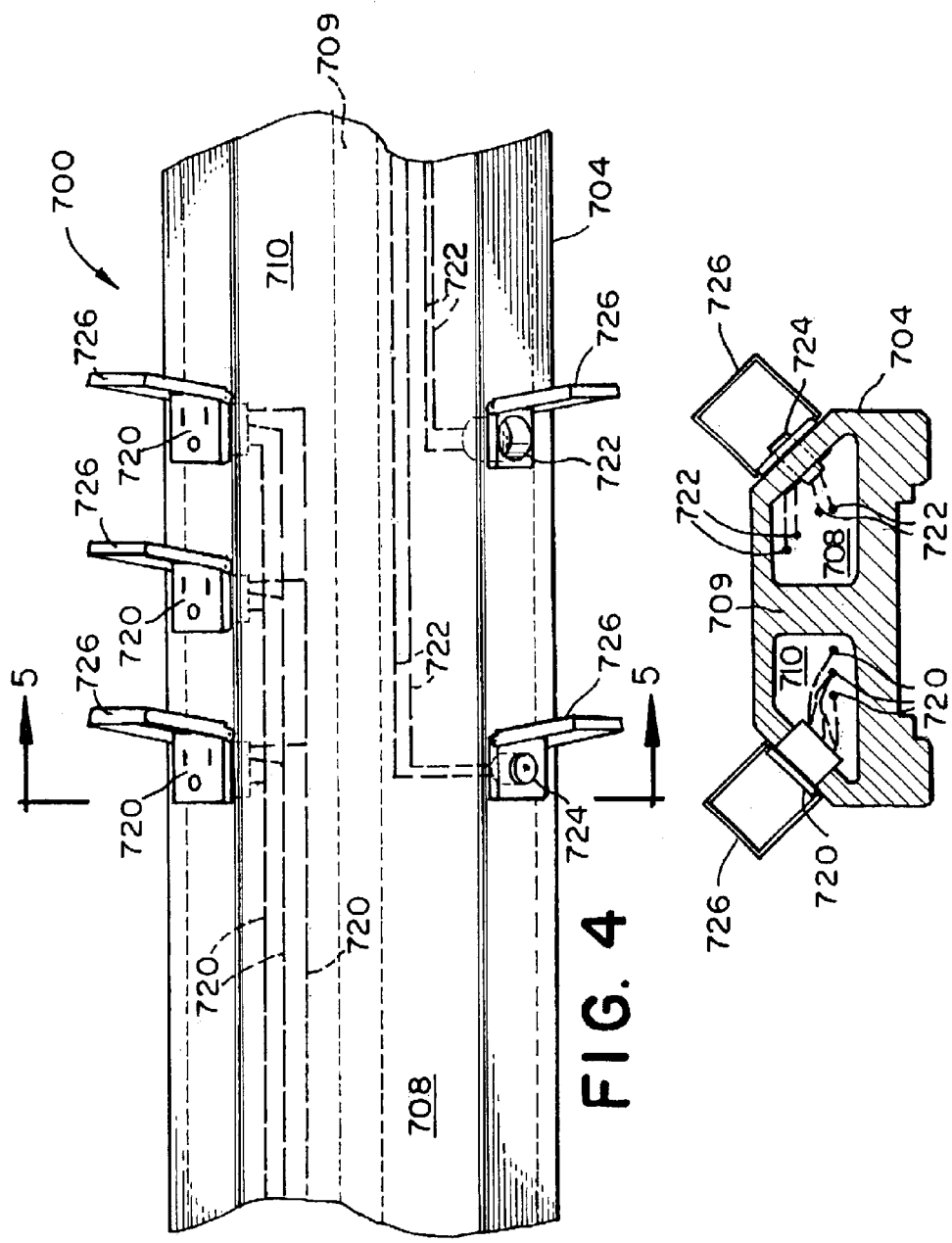

INTEGRATED ELECTRICAL RECEPTACLE SYSTEM FOR OUTDOOR APPLICATION

CROSS-REFERENCE TO RELATED APPLICATIONS

This application is a continuation-in-part of U.S. Non-Provisional patent application Ser. No. 09/934,880, filed Aug. 22, 2001, now U.S. Pat. No. 6,547,589 which is a continuation-in-part of U.S. Non-Provisional patent application Ser. No. 09/679,576, filed Oct. 5, 2000, now abandoned is related to U.S. Provisional Patent Application No. 60/169,763, filed Dec. 9, 1999, and claims the earlier filing date of the provisional application.

BACKGROUND OF THE INVENTION

This invention relates to an integrated electrical receptacle system for outdoor application. More particularly, this invention relates to a system comprising an electrical receptacle mountable in chambered cast-concrete blocks and masonry stones for providing electrical outlets on the exterior surfaces of buildings, retaining walls and outdoor structures.

It is often desired to provide electricity to areas outside of commercial and industrial buildings along with residential properties. Although many such buildings have electrical outlets installed on an outside wall, the outlet, when found on concrete and masonry block construction, is typically powered in a "surface mount" method; i.e. a cable is inserted through metal or plastic conduit that runs along the outside wall of the building and through a portion of the foundation of the structure.

The "surface mount" method of installation has several drawbacks; the outlet is not protected by the structure of the building; locating and installing outlets in a "surface mount" manner is difficult and time consuming; and the outlet is exposed to a variety of moisture from various sources. In time, outlets installed in this manner can break open exposing electrical current carrying parts, which present a dangerous shock hazard.

The present invention allows for multiple electrical connections to be placed in various locations in stone, masonry block and concrete foundations without incurring any of the aforementioned drawbacks. The invention allows for electrical and other types of low voltage outlets such as signals for cable television, telephone/internet access, lighting and stereo speaker wires to located within the masonry block structure itself instead of on its surface. This protects the outlet from moisture and traffic damage, makes it easier to install when the building is originally being constructed and prevents dangerous shock hazards due to loose or broken outlet fixtures.

The present invention allows multiple electrical connections to be placed in various stone, masonry and block structures without incurring any of the aforementioned drawbacks.

BRIEF SUMMARY OF THE INVENTION

Briefly stated, one embodiment of the present invention is directed to a block supporting at least one electrical connection and enclosing in a conduit at least one electrical conductor in electrical communication with the at least one electrical connection, the block having a cavity, a front surface and a rear surface. The front surface bears an opening to the cavity. The at least one electrical connection is disposed in the cavity to be accessible via the opening in the front surface of the block. The at least one electrical conductor extends between the at least one electrical connection and the rear surface of the block, wherein the at least one electrical connection and the at least one electrical conductor enclosed in the conduit are electrically insulated from the block and are insulated from moisture in the block.

The present invention is alternatively directed to a combination of a block and a device for enclosing in a conduit at least one electrical conductor and for supporting at least one electrical connection. The combination includes the block having a cavity for receiving the device, a front surface and a rear surface. The device includes a box having a chamber therein, a front side and a rear side. The front side bears a first opening to the chamber and the rear side bears a second opening to the chamber. The box is positioned in the cavity with the front side generally aligned with the front surface of the block. The at least one electrical connection is generally disposed in the chamber of the box to be accessible from the front surface of the block. A tube is positioned on the rear side of the box and has a chute therethrough. The chute is aligned with the second opening to the chamber. The tube is at least partially disposed in the cavity and generally extends from approximately the rear side of the box to approximately the rear surface of the block. The at least one electrical conductor extends through the tube and is in electrical communication with the at least one electrical connection.

The present invention is alternatively directed to a device for enclosing in a conduit at least one electrical conductor and for supporting at least one electrical connection. The device includes a box having a chamber therein, a front side and a rear side. The front side bears a first opening to the chamber and the rear side bears a second opening to the chamber. The box has a flange disposed around the front side of the box and oriented generally parallel relative to the rear side of the box. The flange has a first major surface for receiving a face plate. The at least one electrical connection is generally disposed in the chamber of the box and is positioned proximate to the front side of the box. A tube is positioned on the rear side of the box and has a chute therethrough. The chute is aligned with the second opening to the chamber. At least one electrical conductor extends through the tube and is in electrical communication with the at least one electrical connection.

The present invention is alternatively directed to receptacle assembly for containing an electrical device and a length of an electrical conductor extending from a supply conduit to the electrical device. The receptacle assembly is mountable in a block having a first side and a second side opposed to and spaced a first distance from the first side. The first side has a first exterior surface and a first interior surface. The second side has a second exterior surface and a second interior surface. A cavity extends from the first interior surface to the second interior surface. The cavity has a first cavity opening in the first side and a second cavity opening in the second side. The receptacle assembly comprises an enclosure, a flange, a hub, a tubular member and a conduit coupling. The enclosure has a unitary wall forming a chamber for containing the electrical device. The unitary wall has a first chamber opening for providing access to the electrical device. The first chamber opening corresponds to the first cavity opening. The flange is integral with the unitary wall and attaches the receptacle assembly to the block. The hub is integral with the unitary wall and provides a second chamber opening for receiving a portion of the length of the electrical conductor. The tubular member has a first longitudinal axis, a first end and a second end. The tubular member extends from the hub to the second cavity opening. The first end is joined to the hub. The conduit coupling has a first coupler and a second coupler. The first coupler is joined to the second end of the tubular member. The second coupler is for being joined to the supply conduit. The receptacle assembly forms a passageway within the cavity. The passageway has a second longitudinal axis and extends from the first exterior surface of the block to the second exterior surface of the block. The passageway is impermeable to fluid in the block.

The present invention is alternatively directed to a block for containing a receptacle assembly. The receptacle assembly has a passageway for containing an electrical device and a length of an electrical conductor. The passageway has a second longitudinal axis. A first portion of the passageway has an outer surface having a first shape generally corresponding to a shape of an outer surface of a body formed by the intersection of a first cylinder with a second cylinder. The first cylinder has a third longitudinal axis. The second cylinder has a fourth longitudinal axis. The third longitudinal axis is coaxial with the second longitudinal axis of the passageway. The fourth longitudinal axis is generally parallel to and spaced-apart from the third longitudinal axis. A second portion of the passageway has a generally circular cross sectional shape. The block comprises a first side, a second side and a cavity. The first side has a first exterior surface and a first interior surface. The second side is opposed to and spaced from the first side. The second side has a second exterior surface and a second interior surface. The cavity extends from the first interior surface to the second interior surface. The cavity has a first cavity opening in the first side and a second cavity opening in the second side. The first cavity opening has a third sidewall extending from the first exterior surface of the first side to the first interior surface of the first side. The third sidewall circumscribes the first cavity opening and has a third shape generally corresponding to the first shape of the outer surface of the first portion of the passageway. The second cavity opening has a fourth sidewall extending from the second exterior surface of the second side to the second interior surface of the second side. The fourth sidewall circumscribes the second cavity opening and has a fourth shape generally corresponding to the generally circular cross-sectional shape of the second portion of the passageway. The second cavity opening has a fifth longitudinal axis coaxial with the third longitudinal axis of the first cylinder.

The present invention is alternatively directed to a method for preparing a block for receiving a receptacle assembly having a passageway. The passageway has a second longitudinal axis. A first portion of the passageway has an outer surface having a first shape generally corresponding to a shape of an outer surface of a body formed by the intersection of a first cylinder with a second cylinder. The first cylinder has a third longitudinal axis. The second cylinder has a fourth longitudinal axis. The third longitudinal axis is coaxial with the second longitudinal axis of the passageway. The fourth longitudinal axis is generally parallel to and spaced a second distance from the third longitudinal axis. A second portion of the passageway has a generally circular cross sectional shape. The block has a first side and a second side opposed to and spaced a first distance from the first side. The first side has a first exterior surface and a first interior surface. The second side has a second exterior surface and a second interior surface. A cavity extends from the first interior surface to the second interior surface. The method comprising the following steps: drilling a first circular opening through the first side of the block, the first circular opening forming a first cavity opening, the first circular opening having a sixth longitudinal axis corresponding to the to the second longitudinal axis of the passageway; drilling a second circular opening through the first side of the block, the second circular opening having a seventh longitudinal axis corresponding to the fourth longitudinal axis; and drilling a third circular opening through the second side of the block, the third circular opening forming a second cavity opening, the third circular opening having an eighth longitudinal axis coaxial with the sixth longitudinal axis.

The present invention is alternatively directed to a method for preparing a block for receiving a receptacle assembly having a passageway. The passageway has a second longitudinal axis. A first portion of the passageway has an outer surface having a first shape generally corresponding to a shape of an outer surface of a body formed by the intersection of a first cylinder with a second cylinder. The first cylinder has a third longitudinal axis. The second cylinder has a fourth longitudinal axis. The third longitudinal axis is coaxial with the second longitudinal axis of the passageway. The fourth longitudinal axis is generally parallel to and spaced a second distance from the third longitudinal axis. A second portion of the passageway has a generally circular cross sectional shape. The block has a first side and a second side opposed to and spaced a first distance from the first side. The first side has a first exterior surface and a first interior surface. The second side has a second exterior surface and a second interior surface. A cavity extends from the first interior surface to the second interior surface. The method comprising the following steps: drilling with a first-step corer of a three-step coring drill a pilot bore through the first side of the block, the pilot bore having a sixth longitudinal axis corresponding to the second longitudinal axis of the passageway; extending the first-step corer through the pilot bore to the interior surface of the second side of the block; drilling with the first-step corer a second cavity opening through the second side of the block; extending the first-step corer through the second cavity opening; drilling with a second-step corer of the three-step coring drill, the second corer having a diameter larger than the first corer, a first circular opening through the first side of the block; extending the second-step corer through the first circular opening; drilling with a third-step counter-borer of the three-step coring drill a first counter bore in the first side of the block; withdrawing the three-step coring drill from the block; removing the first-step corer from the three-step coring drill; drilling with the second-step corer a second circular opening through the first side of the block, the second circular opening having a seventh longitudinal axis corresponding to the fourth longitudinal axis; extending the second-step corer through the second circular opening; drilling with the third-step counter-borer a second counter bore in the first side of the block; and withdrawing the three-step core drill from the block.

The present invention is alternatively directed to a receptacle system for containing an electrical device and a length of an electrical conductor extending from a supply conduit to the electrical device. The receptacle system comprises a block and a receptacle assembly. The block comprises a first side, a second side and a cavity. The first side has a first exterior surface and a first interior surface. The second side is opposed to and spaced a first distance from the first side. The second side has a second exterior surface and a second interior surface. The cavity extends from the first interior surface to the second interior surface. The cavity has a first cavity opening in the first side and a second cavity opening in the second side. The receptacle assembly comprising an enclosure, a flange, a hub a tubular member and a conduit coupling. The enclosure has a unitary wall forming a chamber for containing the electrical device. The unitary wall has a first chamber opening for providing access to the electrical device. The first chamber opening corresponds to the first cavity opening. The flange is integral with the unitary wall and is attached to the block. The hub is integral with the unitary wall and provides a second chamber opening for receiving a portion of the length of the electrical conductor. The tubular member has a first longitudinal axis, a first end and a second end. The tubular member extends from the hub to the second chamber opening. The first end is joined to the hub. The conduit coupling has a first coupler and a second coupler. The first coupler is joined to the second end of the tubular member. The second coupler is for being joined to the supply conduit. The receptacle assembly forms a passageway within the cavity. The passageway has a second longitudinal axis and extends from the first exterior surface of the block to the second exterior surface of the block. The passageway is impermeable to fluid within the block.

The present invention is alternatively directed to a receptacle assembly for receiving and attaching to a support an electrical device connectable to an electrical conductor, the receptacle assembly comprising an enclosure, a first mount and a second mount. The enclosure has a sidewall with an outer surface having a shape generally corresponding to a shape of an outer surface of a body formed by the intersection of a first cylinder eccentric to a second cylinder. The enclosure has a first opening for receiving the electrical device and a second opening for receiving the electrical conductor. The first mount is connected to the enclosure for attaching the receptacle assembly to the support. The second mount is connected to the enclosure for securing the electrical conductor to the enclosure.

The present invention is alternatively directed to a receptacle assembly for containing an electrical device and a length of a non-metallic sheathed electric cable to the electrical device. The receptacle assembly is mountable in a block having a first side and a second side, the first side having a first exterior surface and a first interior surface, the second side having a second exterior surface and a second interior surface. A cavity extends from the first interior surface to the second interior surface. The cavity has a first cavity opening in the first side and a second cavity opening in the second side. The receptacle assembly comprises an enclosure, a first mount and a second mount. The enclosure has a unitary wall forming a chamber for containing the electrical device. The unitary wall has a first chamber opening for providing access to the electrical device. The first chamber opening corresponds to the first cavity opening. The first mount is connected to the unitary wall for securing the enclosure to the block. The first mount comprises a flange circumscribing the outer surface of the unitary wall proximal to the first chamber opening and a retainer pivotably connected to the unitary wall. The retainer is pivotable about a retainer axis between a retracted position and an extended position and is movable along the retainer axis between a disengaged position and an engaged position. The first mount secures the enclosure to the block when the first side of the block is positioned between the flange and the retainer and the retainer is in the extended and engaged positions. The second mount is integral with the unitary wall and is configured to provide a second chamber opening for receiving a portion of the length of the electrical cable, and to connect the electrical cable to the unitary wall.

BRIEF DESCRIPTION OF THE SEVERAL VIEWS OF THE DRAWINGS

The foregoing summary, as well as the following detailed description of the presently preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings:

FIG. 1 is a front perspective view of a block for supporting at least one electrical connection positioned in an exterior wall of a building or the like;

FIG. 4 is a top plan view of the modular outlet assembly of FIG. 4 with the top removed;

FIG. 5 is a cross-sectional view of the modular outlet assembly taken along line 5—5 of FIG. 4;

DETAILED DESCRIPTION OF THE INVENTION

Figure 1:
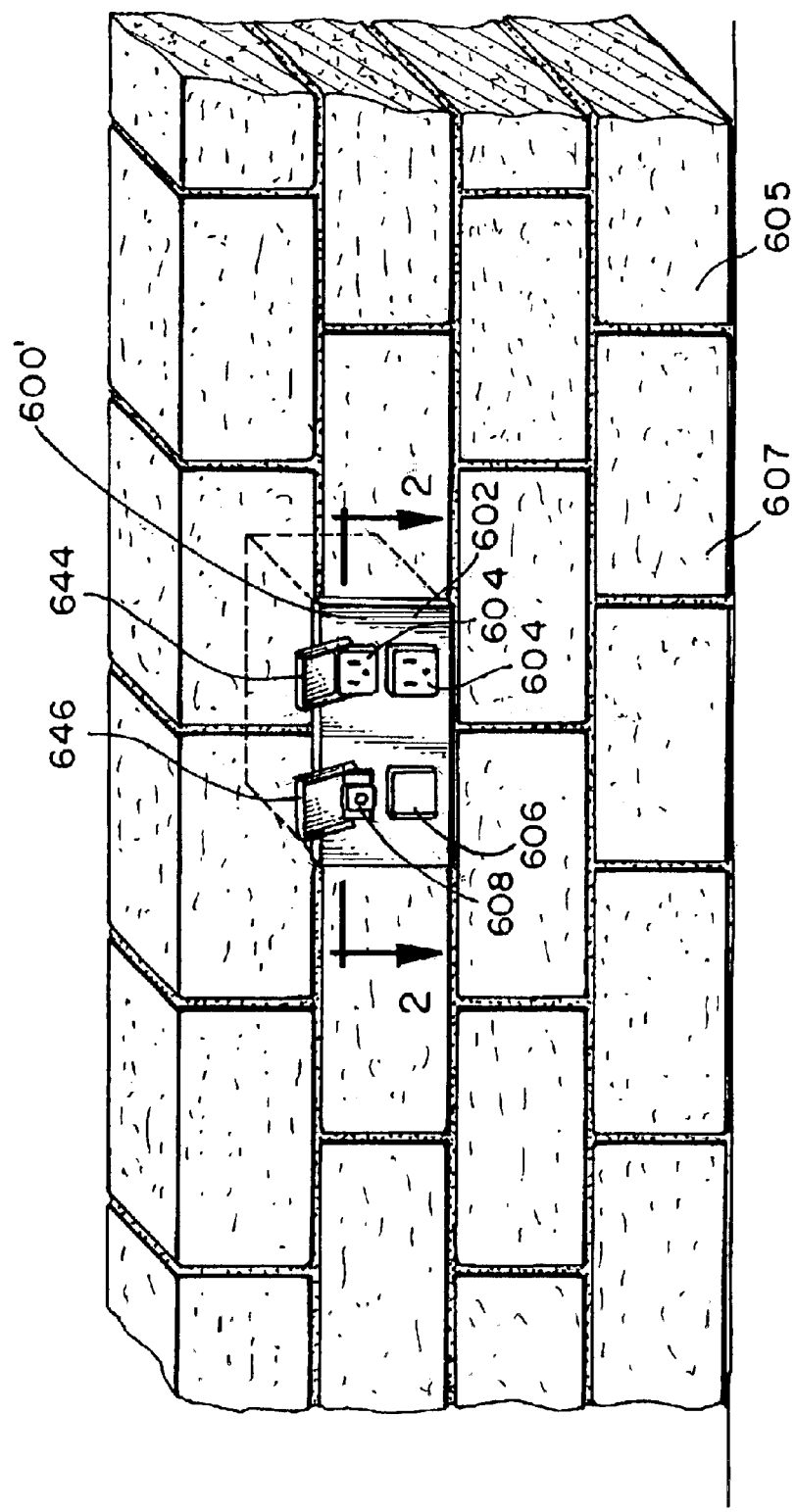

Certain terminology is used in the following description for convenience only and is not limiting. The words "right," "left," "lower" and "upper" designate directions in the drawings to which reference is made. The words "inwardly" and "outwardly" refer to directions toward and away from, respectively, the geometric center of a combination block and device, and designated parts thereof. The word "a," as used in the claims and in corresponding portions of the specification, means "at least one." The term "connected" means that there exists between any two or more elements a structural path, which may include additional elements not explicitly recited. The word "block," as used in the claims and in the corresponding portions of the specification, means "any one of a brick, a concrete block, a masonry block, a masonry unit, a block, and a stone." The term "building," as used in the claims and in the corresponding portions of the specification, means "any one of a house, a commercial establishment, an apartment unit, a commercial building, and a factory." The terminology includes the words noted above, derivatives thereof and words of similar import.

Figure 2:
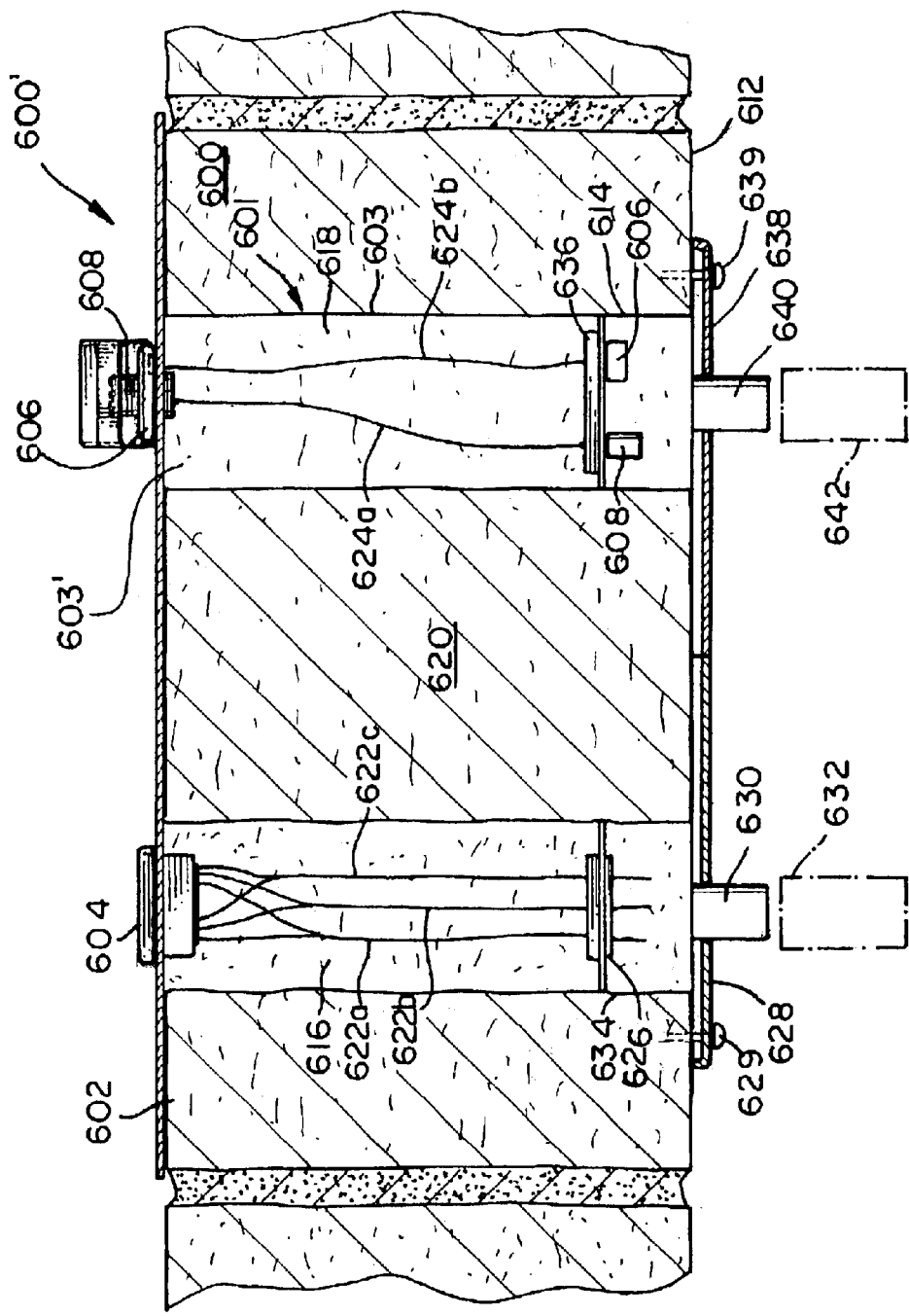
FIG. 2 is a cross-sectional view of the block of FIG. 1 as taken along the line 2—2 of FIG. 1.
Figure 3:
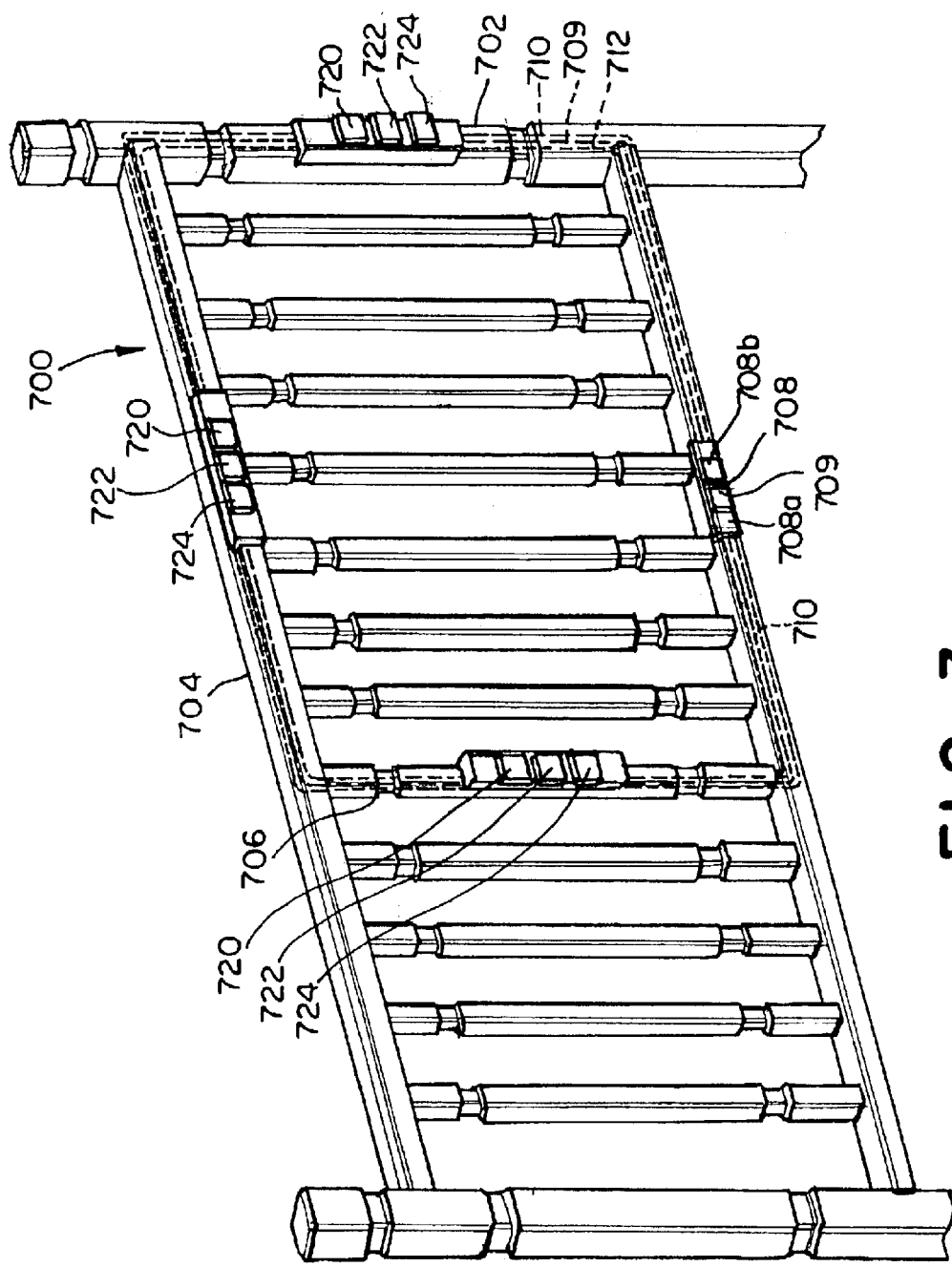
FIG. 3 is a perspective view of a modular outlet assembly.
Figure 11:
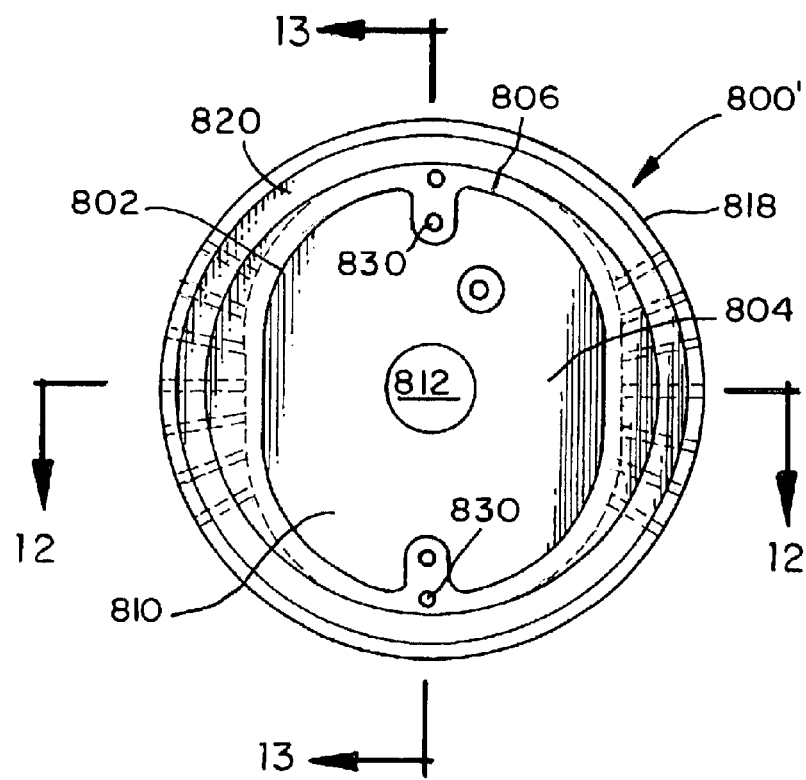
FIG. 11 is front elevation view of a second preferred embodiment of the device for substantially enclosing the at least one electrical connection of the present invention which can also be used with a block (in a fashion similar to that shown in FIG. 14)
Figure 12:
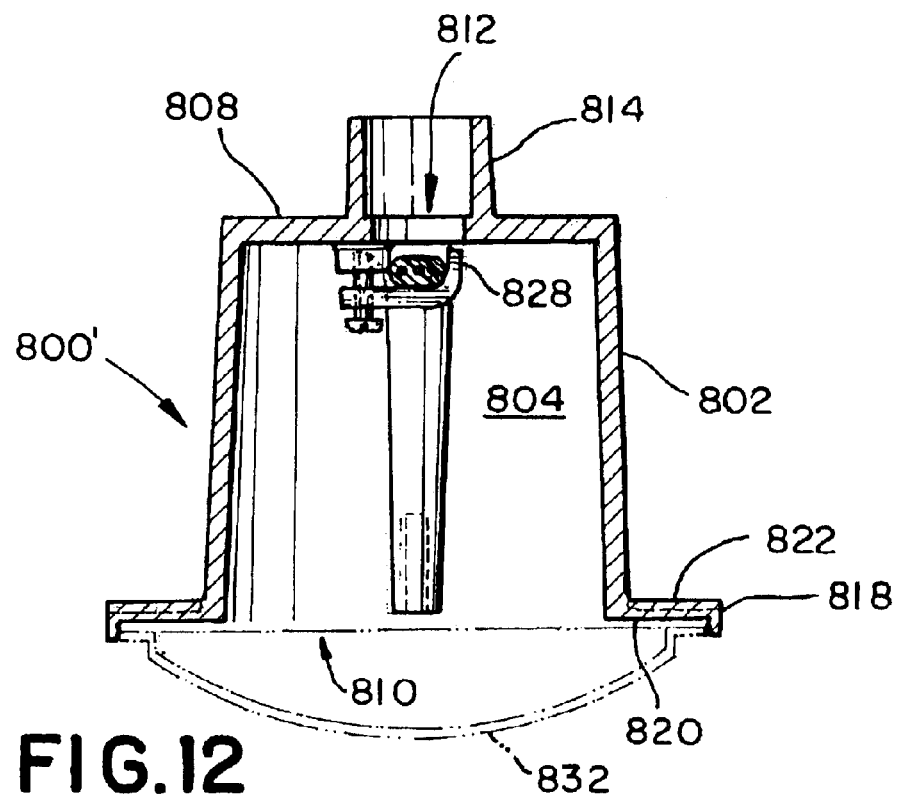
FIG. 12 is a cross-sectional view of the device of FIG. 11 as taken along the line 12—12 of FIG. 11.
Figure 13:
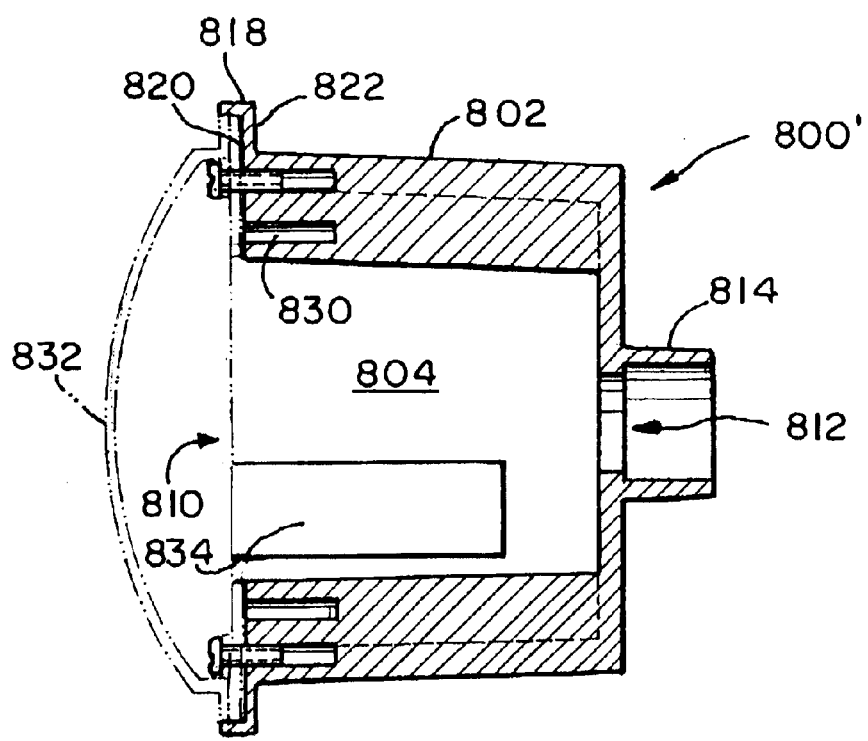
FIG. 13 is a cross-sectional view of the device of FIG. 11 as taken along line 13—13 of FIG. 11 with an optional speaker connection shown (which is not shown in other views)

Referring to the drawings in detail, wherein like numerals represent like elements throughout, FIGS. 1 and 2 illustrate a block, generally designated as 600', supporting at least one electrical connection according to the present invention. FIGS. 3–5 illustrate a modular outlet assembly, generally designated as 700, according to the present invention. FIGS. 6–10 and 14 illustrate portions of a first preferred embodiment of a device, generally designated as 800, for supporting at least one electrical connection according to the present invention. FIGS. 11–13 illustrate portions of a second preferred embodiment of a device, generally designated as 800', for supporting at least one electrical connection according to the present invention.

While one embodiment of electrical conductors and connections is discussed in detail in conjunction with FIG. 2, those of ordinary skill in the art will appreciate from this disclosure that similar electrical conductors and connections can be used with any of the devices shown in the drawings. Accordingly, reference to the electrical conductors and connections shown in FIG. 2 will be made throughout the specification while discussing embodiments of the present invention illustrated in other figures with the understanding that similar electronic structures, or their equivalents, can be used with each of the disclosed embodiments of the present invention.

Referring to FIG. 2 generally speaking, a block 600' supports at least one electrical connection 604, 606, or 608 and encloses at least one electrical conductor 622a, 622b, 622c, 624a, or 624b in electrical communication with the at least one electrical connection 604, 606, or 608. The block 600' has a cavity 603, a front surface 602 and a rear surface 612. The front surface 602 bears an opening 603' to the cavity 603. The at least one electrical connection 604, 606, or 608 is disposed in the cavity 603 to be accessible via the opening 603' in the front surface 602 of the block 600'. The at least one electrical conductor 622a, 622b, 622c, 624a, or 624b extends between the at least one electrical connection 604, 606, or 608 and the rear surface 612 of the block 600', wherein the at least one electrical connection 604, 606, or 608 and the at least one electrical conductor 622a, 622b, 622c, 624a, or 624b are electrically insulated from the block 600' and are insulated from moisture in the block 600'.

Referring to FIGS. 2, 6–10 and 14, the combination of the block 600', 600 and the device 800 preferably encloses at least one electrical conductor 622a, 622b, 622c, 624a, or 624b and supports at least one electrical connection 604, 606, or 608. The block 600', 600 has a cavity 603 that preferably receives the device 800 and has a front surface 602 and a rear surface 612. The device 800 preferably includes a box 802 having a chamber 804 therein. The box 802 preferably has a front side 806 and a rear side 808. The front side 806 bears a first opening 810 to the chamber 804 and the rear side 808 bearing a second opening 812 to the chamber 804.

Figure 14:
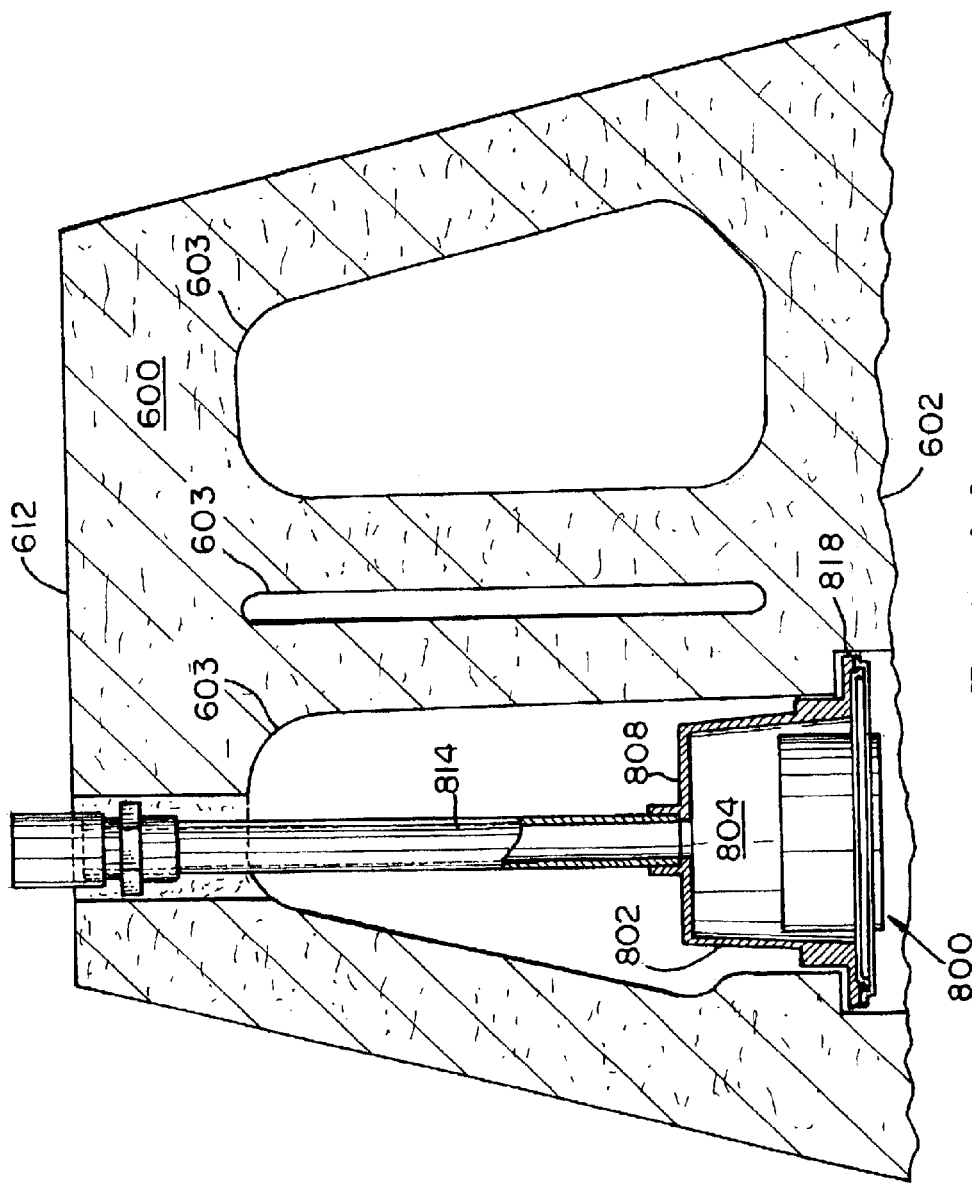
FIG. 14 is a cross-sectional view, similar to FIG. 2, showing a combination of a block and the first preferred embodiment of the device for substantially enclosing the at least one electrical connector.

The box 802 is positioned in the cavity 603 with the front side 806 generally aligned with the front surface 602 of the block 600. The term "generally aligned" encompasses the front side 806 being recessed into the block 600 (as shown in FIG. 14) and encompasses the front side 806 of the box 802 protruding marginally from the block 600. Accordingly, those of ordinary skill in the art will appreciate from this disclosure that the front surface 806 of the box 802 can be slightly recessed into the block 600 to allow a face plate 832 (shown in phantom in FIGS. 12 and 13) to be generally flush (or slightly recessed) with the front portion 602 of the block 600 without departing from the scope of the claimed invention. Additionally, those of ordinary skill in the art will appreciate, that the front surface 806 of the box 802 can extend slightly from the front portion 602 of the block 600 while still being generally aligned with the front surface 602 of the block 600.

The at least one electrical connection 604, 606, or 608 is generally disposed in the chamber 804 of the box 802 to be accessible from the front surface 602 of the block 600. Those of ordinary skill in the art will appreciate from this disclosure that the at least one electrical connection can protrude partially outwardly from the chamber 804 while still being generally disposed in the chamber 804. A tube (or conduit) 814 is positioned on the rear side 808 of the box 802 and has a chute 816 extending therethrough. The chute 816 is preferably aligned with the second opening 812 to the chamber 804. The tube 814 is preferably at least partially disposed in the cavity 603 and generally extends from the rear side 808 of the box 802 to the rear surface 612 of the block 600. The at least one electrical conductor 622a, 622b, 622c, 624a, or 624b extends through the tube 814 and is in an electrical communication with the at least one electrical connection 604, 606, or 608.

Additionally, the combination block 600 and device 800, 800' can be used to form part of an exterior wall of a building having at least one electrical connection 604, 606, or 608 accessible from outside the building. Referring to FIG. 1, such a building would include an exterior wall 605 having a wall exterior surface 607 disposed outside of the building. The exterior wall 605 preferably includes the block 600 having the cavity 603 for receiving the device 800, 800', a front surface 602 and a rear surface 612.

Referring to FIG. 2, a front portion 602 of the block 600' preferably, but not necessarily, includes at least one electrical outlet 604, at least one telephone connector 606 or at least one cable connector 608. A rear portion 612 of the block 600' preferably includes first and second junction boxes 614, 634 which will be discussed in more detail herein. The block 600' preferably has a cavity 603 comprising two channels 616, 618 extending from the front 602 to the rear 612 of the block 600'. The cavity 603 preferably, but not necessarily, contains at least one electrical channel, such as a power channel 616 and a low voltage channel 618.

Referring to the block 600' shown in FIGS. 1 and 2, the channels 616, 618 are preferably separated by a partition

620. The power channel 616 may include a plurality of conductors 622 including a hot conductor 622a, a neutral conductor 622b, and a ground conductor 622c for transmitting electrical power from the rear 612 of the block 600' to the front 602 of the block 600'. The low voltage channel 618 preferably includes low voltage cables 624 connecting the rear 612 of the block 600' to the surface 602 of the block 600'. The low voltage cables 624 can include co-axial cables 624a, telephone cables 624b, or other multi-conductor cables (not shown).

Referring to FIG. 2, the second junction box 634 includes a first opening 626 at a forward end of the junction box 634 which is in communication with the power channel 616. The plurality of conductors 622 extend through the first opening 626 and terminate within the junction box 634. The second junction box 634 preferably includes a removable cover 628 at a rear end of the second junction box 634 opposite the first opening 626. The cover 628 preferably includes a conduit connection 630 to connect the interior of the second junction box 634 to a well known electrical conduit fitting 632 (in phantom). Also preferably, the cover 628 includes a gasket 629 or other type of seal to provide a watertight seal between the cover 628 and the second junction box 634.

The electrical insulation and moisture insulation between the block 600' and the at least one electrical connection 604, 606, or 608 and the at least one electrical conductor 622a, 622b, 622c, 624a, or 624b is preferably provided by a PVC sheath or similar dielectric material. However, those of ordinary skill in the art will appreciate from this disclosure that various other suitable materials, such as rubber, can be used to provide electrical and moisture insulation from the block 600', or the surrounding blocks, without departing from the scope of the present invention.

The first junction box 614 preferably includes a first opening 636 at a forward end of the junction box 614 which is in communication with the low voltage channel 618. The plurality of low voltage conductors 624 extend through the first opening 636 and terminate at appropriate connectors 606, 608 within the first junction box 614. The first junction box 614 also preferably includes a removable cover 638 at a rear end of the first junction box 614 opposite the first opening 636. The cover 638 preferably includes a conduit connection 640 to connect the interior of the first junction box 614 to a well known electrical conduit fitting 642 (shown in phantom lines in FIG. 2). Also preferably, the cover 638 includes a gasket 639 or other type of seal to provide a watertight seal between the cover 638 and the first junction box 614.

Those skilled in the art will recognize that, instead of first and second junction boxes 614, 634, a single junction box (not shown) can be used with the block 600' for terminating the plurality of conductors 622 and for supporting at least one electrical connector 606, 608 shown in FIG. 2. It is preferable that the power channel 616 and the low voltage channel 618 are separated by a solid partition 620 and that two separate conduit connectors, one on either side of the partition 620, are used. Additionally, instead of two separate covers 628, 638, a single cover (not shown) can be used.

The block 600' can be, but is not necessarily, constructed from a polymeric material or some other suitable dielectric material. If the block 600 is constructed of a polymeric material, the block 600' is preferably shaped and colored similarly to other construction or decorative blocks surrounding the block 600' to blend in with those blocks. Also, the front 602 of the block 600' preferably, but not necessarily, includes a power cover 644 and a low voltage cover 646 (shown in FIG. 1) which are each hingedly connected to the block 600'. Each cover 644, 646 is pivotable between a first, closed position covering the at least one electrical connection 604, 606, or 608 and a second, open position exposing each of the respective outlets or connections. In the closed position, the covers 644, 646 preferably seal the respective outlets 604 or connections 606, 608, forming a generally watertight seal over the outlets or connections. Also, the covers 644, 646 can preferably be locked closed either individually or as a group, preferably by a well known lock hasp and a padlock arrangement (not shown). However, those skilled in the art will recognize that the covers 644, 646 can be locked in the closed position by other methods as well.

The block 600' is preferably, but not necessarily, constructed so that the block 600' can be located at any level of the wall as shown in FIG. 2 and so that the block 600' can support the weight of any subsequent blocks stacked upon the block 600. Additionally, the block 600' can include at least one speaker connection 834 (shown in FIG. 13) disposed within the cavity 603 or within the device 800, 800'. While a speaker connection is shown in device 800', those of ordinary skill in the art will appreciate from this disclosure that the speaker connection 834 can optionally be added to the block 600' shown in FIGS. 1 and 2 or to the first preferred embodiment of the device 800.

To connect the block 600' to a power or low voltage source (not shown), the user preferably runs conduits 632, 642 to the rear side 612 of the block 600'. To access a junction box 614, 634, the cover 628, 638 is preferably removed from the block 600'. If power cables are being run, the ends of the power cables are run through the conduit 632 and through the conduit connection 630 in the cover 628 and are then connected to the conductors 622 in the second junction box 634. The cover 628 is then reinstalled on the junction box 634 and the conduit fitting 632 is connected to the conduit connection 630. If low voltage cables are being run, the ends of the low voltage cables are run through the conduit 642 and through the conduit connection 640 in the cover 638 and the end connectors (not shown) are connected to the connectors 606, 608 injunction box 634. The cover 638 is then reinstalled on the junction box 634 and the conduit fitting 642 is connected to the conduit connection 640.

Although the junction boxes 614, 634 are preferably located at the rear 612 of the block 600', those skilled in the art will recognize that the junction boxes 614, 634 can be located on other sides of the block 600' as well.

Those of ordinary skill in the art will appreciate from this disclosure that other methods of conveying power to the at least one electrical connection 604, 606, or 608 can be used without departing from the scope of the present invention. For example, electrical connections can be disposed on both sides of the block 600'.

Figure 6:
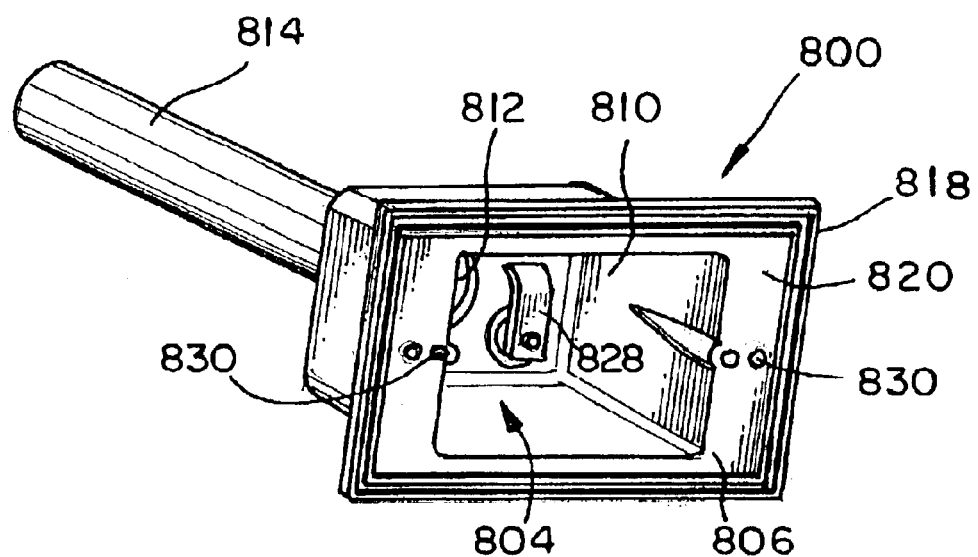
FIG. 6 is a front perspective view of a preferred embodiment of a device of the present invention for use in substantially enclosing the at least one electrical connection, the device can be used with a block (as shown in FIG. 14)
Figure 7:
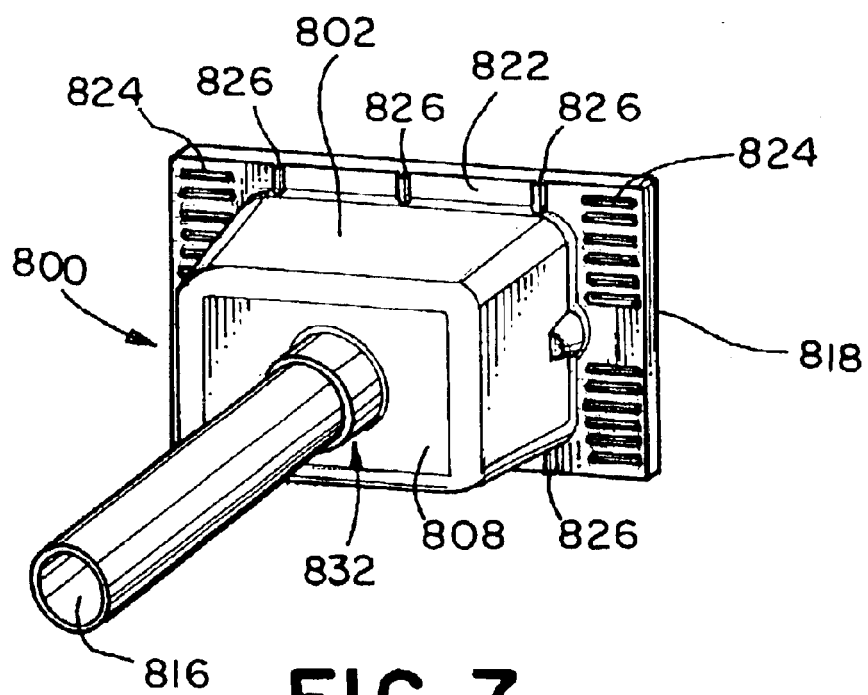
FIG. 7 is a rear perspective view of the device of FIG. 6.
Figure 8:
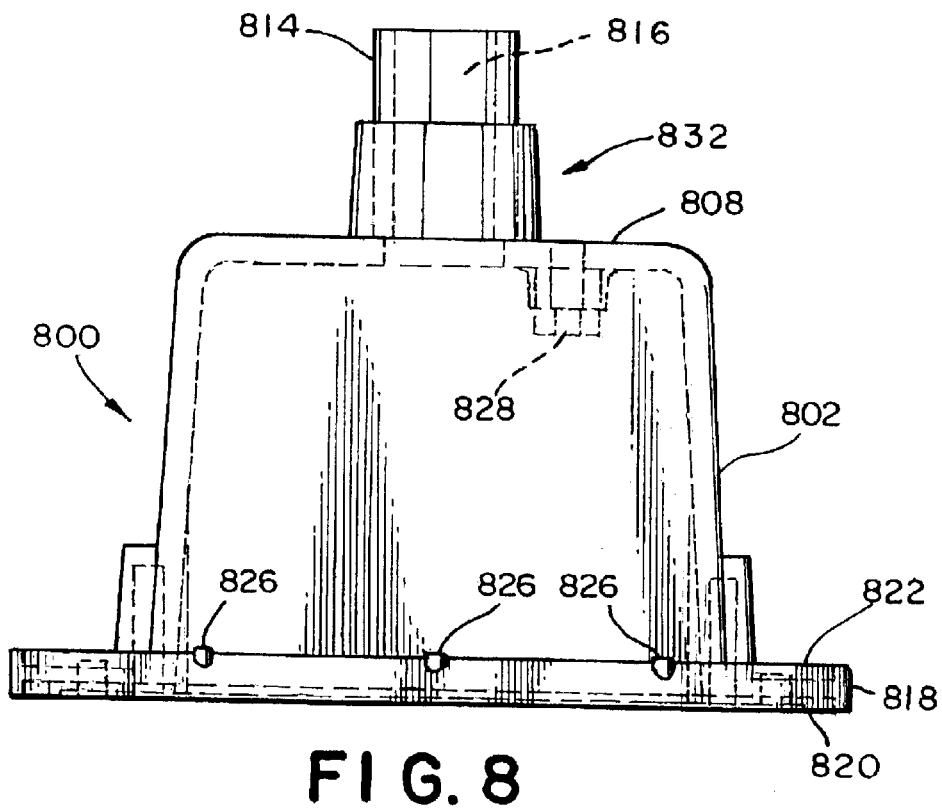
FIG. 8 is a partial top plan view of the device of FIG. 6.

Referring to FIGS. 6–10 and 14, a first preferred embodiment of a device 800 for use with a block 600 is shown. Referring to FIG. 8, the box 802 is preferably formed as a separate piece from the tube 814. Referring to FIG. 7, the box 802 preferably has a generally rectangular box-like shape. However, those of ordinary skill in the art will appreciate from this disclosure that the box 802 can have any shape without departing from the scope of claimed invention. For example, the box 802 can be hemispherical, elliptical, rectangular, irregularly shaped or the like without departing from the scope of the present invention. For example, referring to FIGS. 11–13, a box 802 having a generally cylindrical shape is shown.

During the assembly of the first preferred embodiment of the device 800, a watertight seal using a molded in PVC joint 832 is preferably formed between the tube 814 and the box 802. It is preferred, but not necessary, that the device 800 be formed of PVC material. However, those of ordinary skill in the art will appreciate from this disclosure that various materials can be used to form the device 800 without departing from the scope of the present invention. Additionally, those of ordinary skill in the art will appreciate from this disclosure that the tube 814 and the box 802 can be formed as a single element without departing from the scope of the claimed invention.

Referring to FIGS. 7 and 11, the device 800, 800' preferably, but not necessarily, includes a flange 818 disposed around the front side 806 of the box 802 which is oriented generally parallel relative to the front surface of the block 600. Those of ordinary skill in the art will appreciate from this disclosure that many types of block 600 do not have an even planar front surface and, accordingly, it is only possible to be generally parallel with the average front surface 602 of a block 600. Thus, the term "generally parallel" as used in the claims and in the corresponding portions of the specification should not be interpreted to exclude the use of the device 800, 800', with blocks having a curved, decorative, or irregular front surfaces (as shown in FIG. 14). Instead, generally parallel should be interpreted to mean generally parallel to the overall front surface of the block or wall of which the block 600 is a part.

The flange preferably bears fastener holes 830 to allow an outlet plate 832 (shown in phantom lines in FIGS. 12 and 13) to be secured over the first opening 810 of the box 802. Those of ordinary skill in the art will appreciate that various methods can be used to secure the outlet plate 832 to the device 800, 800' or that the outlet plate 832 can be omitted altogether without departing from the scope of the present invention.

Referring to FIGS. 6 and 7, the flange 818 preferably has a first major surface 820 for receiving a face plate and preferably has a second major surface 822 for at least partially abutting the block 600, as shown in FIG. 14. While FIG. 14 shows the device 800 seated off-center in the block 600, those of ordinary skill in the art will appreciate that the position of the device 800 within the block 600 can be varied without departing from the scope of the present invention. Referring to the second embodiment of the device 800' shown in FIG. 11, the front side 806 of the box 802 is preferably designed to accommodate a round electrical cover plate 832. Those of ordinary skill in the art will appreciate from this disclosure, that the front 806 of the device 800, 800' and the cover plate 832 can have any desired shape without departing from the scope of the present invention.

Referring to FIG. 14, the flange 818 is preferably, but not necessarily, aligned with the front surface 602 of and recessed into the block 600. Referring to FIG. 7, an adhesive 824 is preferably, but not necessarily, disposed on the second major surface 822 of the flange 818 to securely engage the box 802 with the block 600. The adhesive is preferably, but not necessarily, disposed on the second major surface in a plurality of strips of adhesive.

Figure 9:
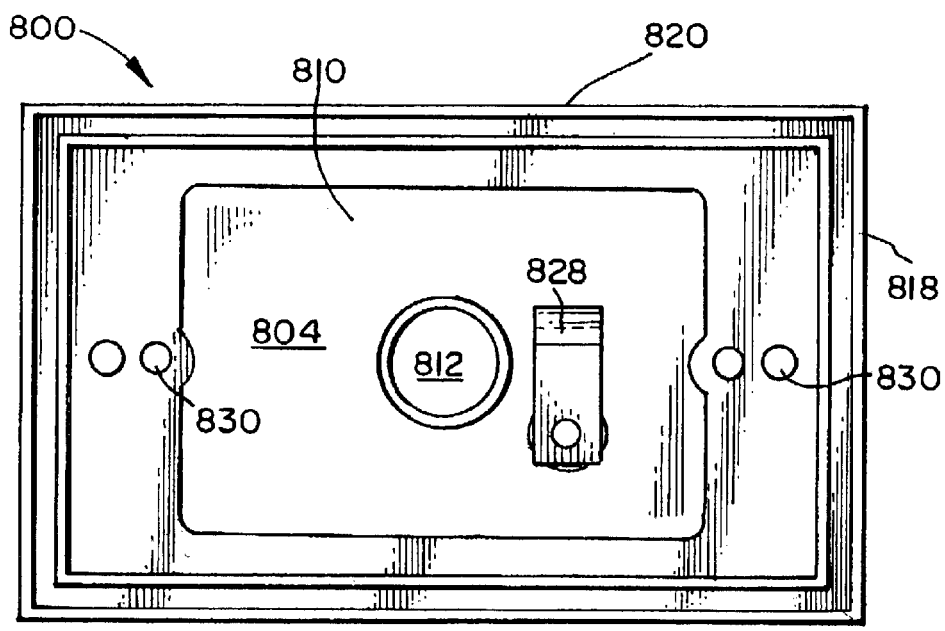
FIG. 9 is a front elevation view of the device of FIG. 6.
Figure 10:
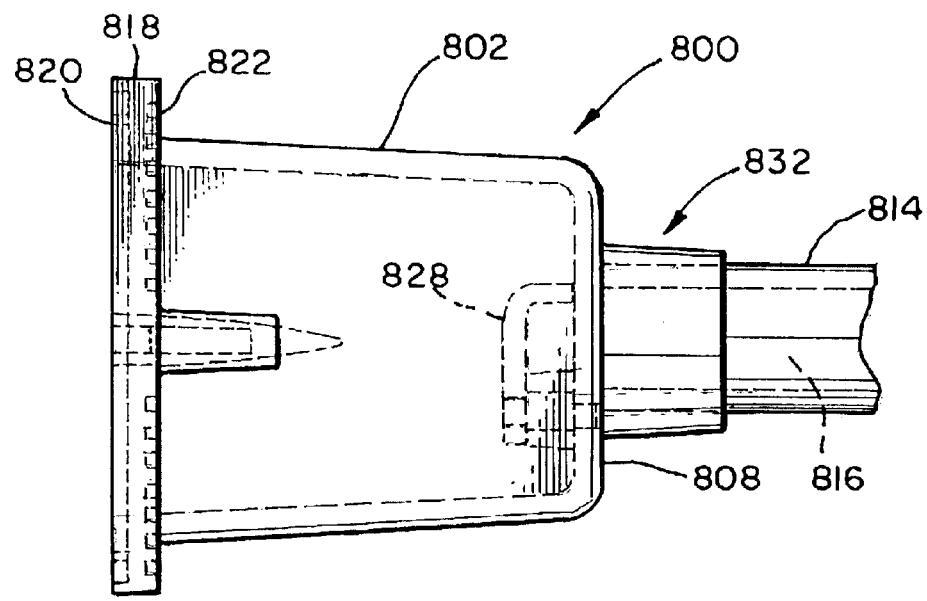
FIG. 10 is a partial left side elevation view of the device of FIG. 6.

The second major surface 822 preferably includes grooves 826 which allow fluid to drain without contacting the adhesive 824. Referring to FIG. 8, the tube 816 preferably extends generally perpendicularly from the rear side 808 of the box 802. The term generally perpendicularly as used in the claims means within about thirty degrees of perpendicular from the rear side 808 of the box 802 which is comparable to the tolerance error which can occur on a construction site with such an item. More preferably still, the term generally perpendicular, as used in the claims, means within about fifteen (15) degrees of perpendicular from the rear surface 612 of the block 600. Referring to FIGS. 6 and 9, a wire clamp 828 is preferably, but not necessarily, disposed within the chamber 804 for securing at least one electrical conductor 622a, 622b, 622c, 624a, or 624b.

It is preferable that the at least one electrical connection 604, 606, or 608 include at least one electrical outlet 604, at least one phone jack 606, or at least one cable connector 608. It is more preferable, that the at least one electrical connection include at least one electrical outlet 604 and at least one phone jack 606. It is more preferable still, that the at least one electrical connection include at least one electrical outlet 604, at least one phone jack 606 and at least one cable connector 608.

The present invention also includes a method of forming a block 600 for receiving a device 800, 800' which extends from approximately a rear, or first, side 612 of the block 600 to approximately a front, or second, side 602 of the block 600. The device 800, 800' is adapted to convey at least one electrical conductor 622a, 622b, 622c, 624a, or 624b to at least one electrical connector 604, 606, or 608 positioned proximate to the second side 602 of the block 600. The device 800, 800' includes a box 802 having a front side 806 and a rear side 802. A tube 814 is positioned on the rear side 808 of the box 802 and generally extends outwardly from the rear side 808 of the box 802. The method of forming the block 600 for receiving the device preferably includes positioning a mold to receive material to be formed into a block 600 having a cavity 603 for receiving the device 800, 800'. The cavity 603 is formed so that when the device is placed in the cavity 603 the front side 806 of the box 802 is generally aligned with the second side 602 of the block 600 and so that the tube 814 extends from the rear side 808 of the box 802 to approximately the first side 612 of the block 600. The method of the present invention also includes placing material in the mold and removing the block from the mold. Processes for molding blocks are set forth in detail in U.S. Pat. Nos. 5,277,853, 5,887,401, and 6,113,379 which are each hereby incorporated by reference herein in their entirety.

As shown in FIGS. 3–5, as an alternative to using blocks, the electrical cables can be run to outlets 720 and/or connectors 722, 724 mounted in a railing section 700, particularly in a side post 702, a top rail 704 or a spindle 706. The modular outlet assembly can be in the form of other items typically found in a residential or commercial outdoor environment, including, but not limited to, a water fountain (not shown), a statue (not shown), or a piece of furniture (not shown).

The railing section 700 is preferably constructed from a dielectric material, and more preferably, from a plastic or other suitable polymeric material. Preferably, a junction box 708 is located on the railing section 700, such as, by way of example and not meant to be limiting, along a bottom rail as shown in FIG. 3. The junction box 708 is similar to, and preferably identical to, the junction boxes 614, 634 described above in connection with the block 600, and includes connections (not shown) for an electrical conduit to bring electrical power and low voltage electrical signals to the junction box 708. The junction box 708 includes a junction box 708a for electrical power connections as well as a junction box 708b for co-axial cable and telephone cable connections 722, 724. The junction boxes 708a, 708b are partitioned from each other by a wall 709.

The railing section 700 includes an enclosed power cable channel 710 with power cables 720 run therethrough which terminate at the outlet 720 on one end of the cables 720 and in the junction box 708a on the other end of the cables. Electrical power cables (not shown) can be run through the electrical conduit and spliced to the power cables 720 in the junction box 708a. The railing section 700 also includes an enclosed low voltage channel 712 with low voltage cables 722 run therethrough which terminate at the connections 722, 724 on the side post 702, the top rail 704 or the spindle 706 at one end of the cables 722, and at the connectors 722, 724 in the junction box 708b at the other end of the cables 722. Similar to the block 600, the railing section 700 can include at least one speaker connection (not shown), with a speaker cable (not shown) being run through the low voltage channel 712.

Covers 726 (shown in FIGS. 4 and 5 only, for clarity) are hingedly connected to the railing section 700 and are operable between a closed position, which covers the outlets 720 and the connectors 722, 724, and an open position, which exposes the outlets 720 and the connectors 722, 724. Although FIGS. 4 and 5 show individual covers 726 for each outlet 720 and connector 722, 724, those skilled in the art will recognize that a single cover (not shown can be used to cover all of the outlets 720 and connectors 722, 724. Additionally, those skilled in the art will recognize that the covers 726 can be secured in a closed position by a lock (not shown) to avoid unauthorized use of the outlets 720 and/or the connectors 722, 724.

Preferably, each element described above which includes power cables includes a "hot" conductor, a "neutral" conductor, and a "ground" conductor. However, those skilled in the art will recognize that each element can include additional conductors as well. Preferably, the electrical outlets 604, 720 described above are 125 volt, 15 amp, Ground Fault Circuit Interrupter (GFCI) outlets, although those skilled in the art will recognize that the outlets can be other voltages and current ratings, and need not necessarily be GFCI outlets.

Although the low voltage is discussed as being telephone or co-axial cable, those skilled in the art will recognize that other types of cables, including but not limited to, audio speaker cable and fiber optic cable, can also be run through the open or low voltage channels 618 and 712. In addition to or alternatively to the co-axial connectors 608, 722 and the telephone cable connectors 606, 724, speaker jacks, fiber optic connectors and other connectors (not shown) can be used.

Figure 15:
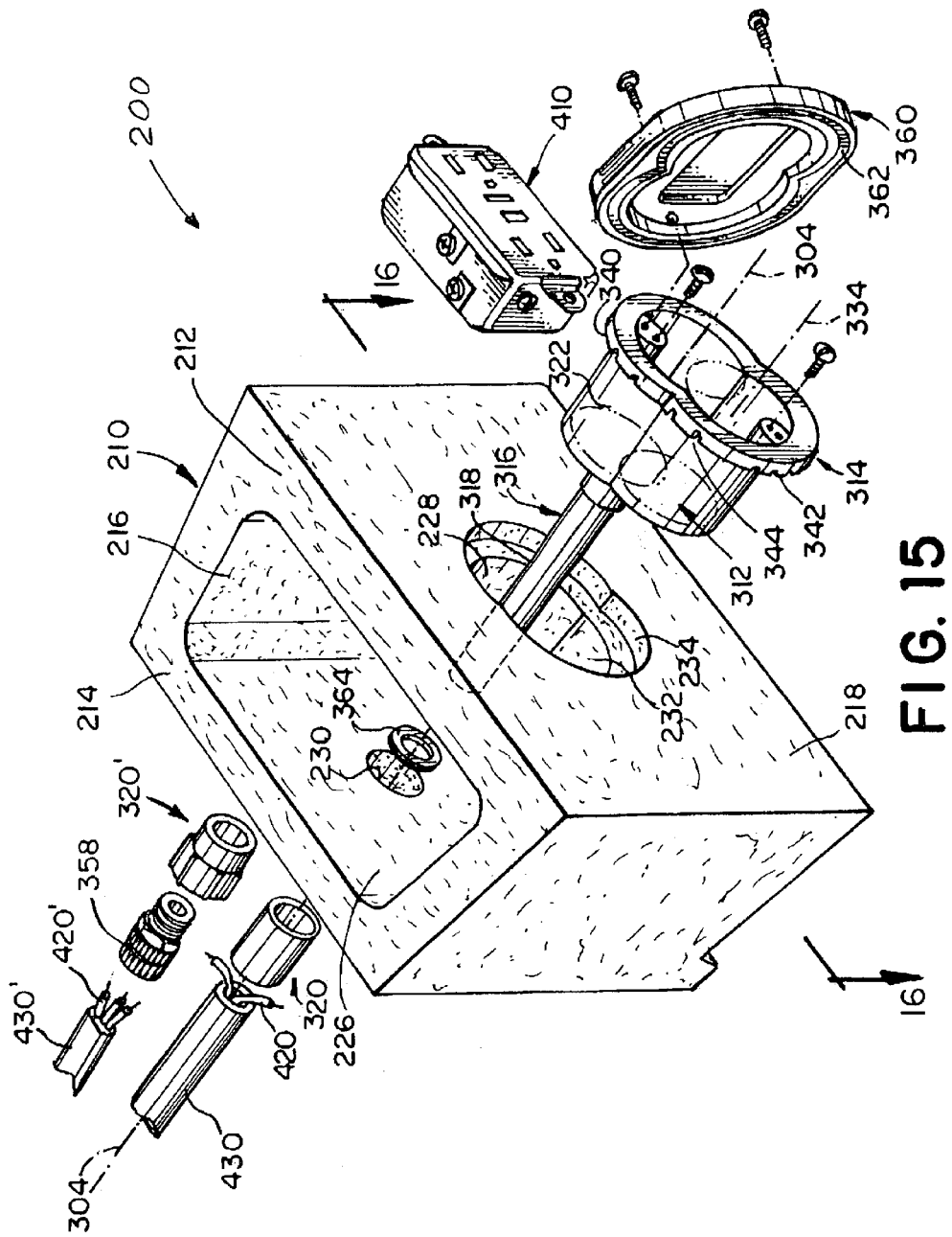
FIG. 15 is an exploded perspective view of a third preferred embodiment of the receptacle system in accordance with the present invention.
Figure 16:
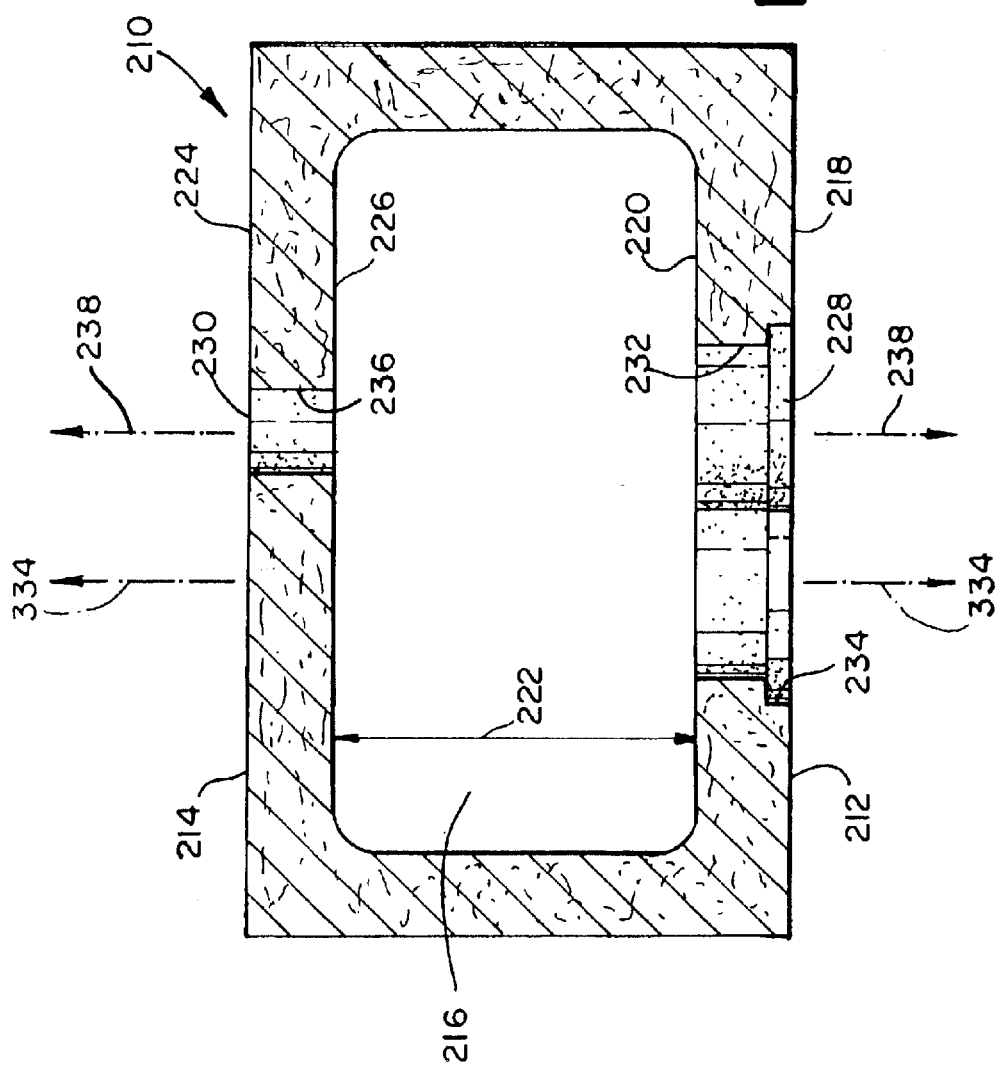
FIG. 16 is cross-sectional view of the block in FIG. 15 taken along the line 16—16 of FIG. 15.
Figure 17:
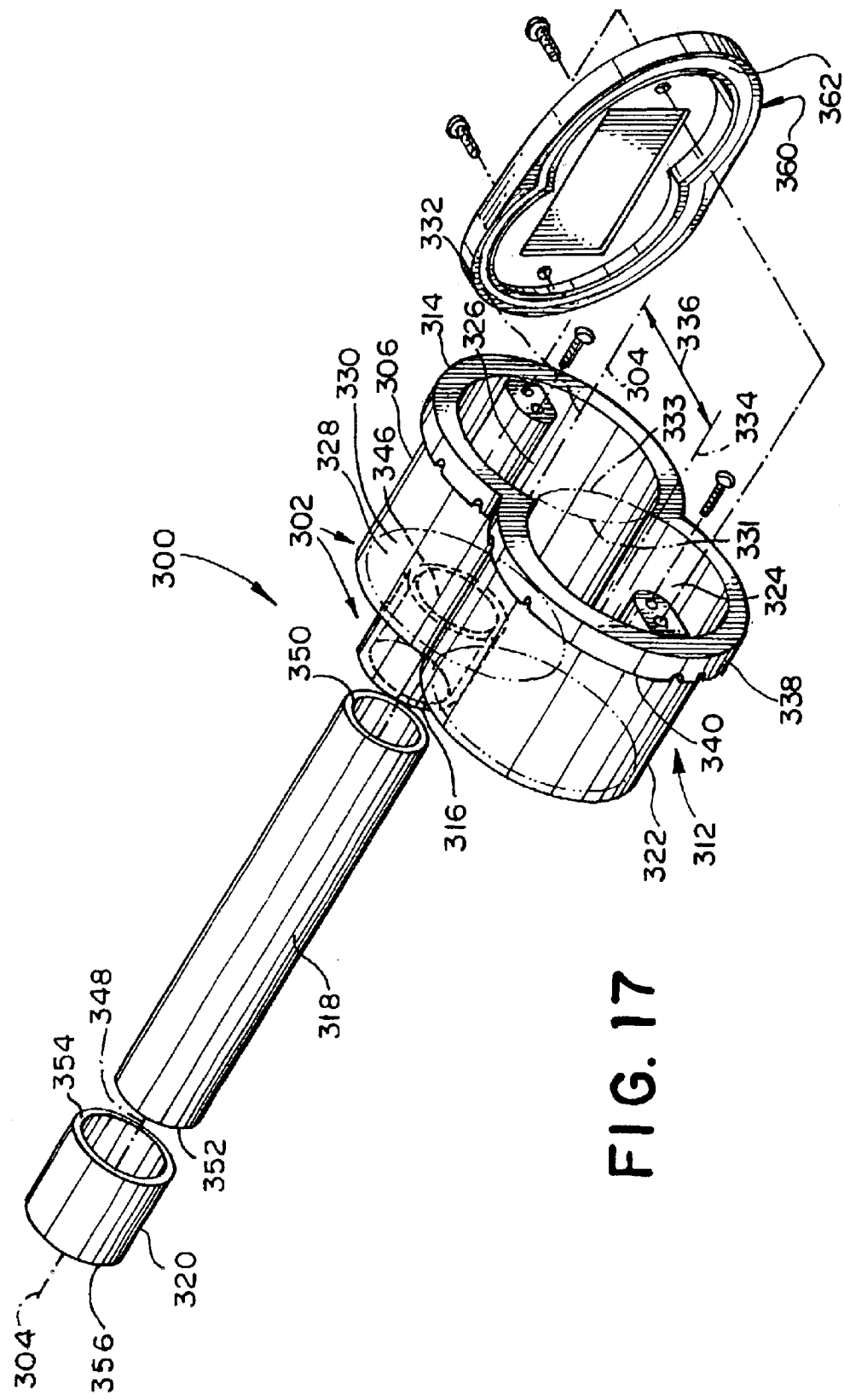
FIG. 17 is an exploded perspective view of the receptacle assembly shown in FIG. 15.

Referring to FIGS. 15–17, there is shown a third preferred embodiment of the integrated electrical receptacle system, generally designated 200, and hereinafter referred to as the "receptacle system" 200, in accordance with the present invention. The receptacle system 200 comprises a block 210 and a receptacle assembly 300. The receptacle assembly 300 forms in the block 210 a passageway 302 having a second longitudinal axis 304. The passageway 302 extends from a first exterior surface 218 of the block 210 to the second exterior surface 224 of the block 210 and is for containing an electrical device 410 and a length of an electrical conductor 420, 420' extending from a supply conduit 430 or a cable 430' suitable for underground installation to the electrical device 410. The passageway 302 is impermeable to fluid within the block 210.

Those having ordinary skill in the art of receptacle systems will understand from the present disclosure that the block 210 can be a wide variety of block sizes and shapes having a wide variety of decorative facings. The artisan will also understand that the electrical device 410 may be a variety of well known devices and may or may not include outlets or connection such as a power outlet, a low voltage outlet, a telephone outlet, an audio/video outlet or the like or such additional devices as lighting fixtures, speakers, and displays. Further, the artisan will understand that the electrical conductor 420, 420' may be a variety of well known conductors such as high or low voltage cable, co-axial cables, telephone cables and other multi-conductor cables. Still further, the artisan will understand that the passageway 302 by virtue of its impermeability, insulates the electrical device 410 and conductor 420, 420' from moisture and generally serves as a weather proofing barrier.

Referring to FIG. 16, the block 210 comprises a first side 212, a second side 214 and a cavity 216. The first side 212 has a first exterior surface 218 and a first interior surface 220. The second side 214 is opposed to and spaced a first distance 222 from the first side 212. The second side 214 has a second exterior surface 224 and a second interior surface 226. The cavity 216 extends from the first interior surface 220 to the second interior surface 226. The cavity 216 has a first cavity opening 228 in the first side 212 and a second cavity opening 230 in the second side 214. The first cavity opening 228 has a third sidewall 232 extending from the first exterior surface 218 of the first side 212 to the first interior surface 220 of the first side 212. The third sidewall 232 circumscribes the first cavity opening 228 and has a third shape generally corresponding to the first shape of the outer surface 330 of the first sidewall 328 of the unitary wall 322, discussed below. Preferably, the third sidewall 232 has a counter bore 234. The second cavity opening 230 has a fourth sidewall 236 extending from the second exterior surface 224 of the second side 214 to the second interior surface 226 of the second side 214. The fourth sidewall 236 circumscribes the second cavity opening 230 and has a fourth shape generally corresponding to the generally circular cross sectional shape of the second portion 308 of the passageway 302. The second cavity opening 230 has a fifth longitudinal axis 238 coaxial with the third longitudinal axis 332 of the first cylinder.

Referring to FIG. 17, the receptacle assembly comprises an enclosure 312, a flange 314, a hub 316, a tubular member 318, and a conduit coupling 320. The enclosure 312 has a unitary wall 322 forming a chamber 324 for containing the electrical device 410. The unitary wall 322 has a first chamber opening 326 for providing access to the electrical device 410. The first chamber opening 326 corresponds to the first cavity opening 228. Preferably, the unitary wall 322 has a first sidewall 328 that forms a first portion 306 of the passageway 302. The first sidewall 328 has an outer surface 330 having a first shape generally corresponding to a shape of an outer surface of a body formed by the intersection of a first cylinder 331 (partially shown in phantom) with a second cylinder 333 (partially shown in phantom shown). The first cylinder 331 has a third longitudinal axis 332. The second cylinder 333 has a fourth longitudinal axis 334. The third longitudinal axis 332 is coaxial with the second longitudinal axis 304 of the passageway 302. The fourth longitudinal axis 334 is generally parallel to and spaced a second distance 336 from the third longitudinal axis 332. Preferably the first sidewall 328 is tapered.

The flange 314 is integral with the unitary wall 322 and is attached to the block 210. Preferably, the flange 314 circumscribes the outer surface 330 of the first sidewall 328 of the unitary wall 322 proximal to the first chamber opening 326 and has a second sidewall 338 spaced from and generally parallel to the outer surface 330 of the first sidewall 328 of the unitary wall 322. The second sidewall 338 has a second shape generally corresponding to the first shape of the outer surface 330 of the first sidewall 328. The flange 314 has a mounting surface 340 abutting the counter bore 234 and adhering to the counter bore 234. The mounting surface 340 has at least one adhesive slot 342 and at least one drainage slot 344.

The hub 316 is integral with the unitary wall 322. The hub 316 provides a second chamber opening 346 for receiving a portion of the length of the electrical conductor 420.

The tubular member 318 has a first longitudinal axis 348, a first end 350 and a second end 352. The first longitudinal axis 348 is coaxial with the third longitudinal axis 332 of the first cylinder 331. The tubular member 318 extends from the hub 316 to the second cavity opening 230. The tubular member 318 forms a second portion 308 of the passageway 302. The first end 350 of the tubular member 318 is joined to the hub 316. Preferably, the tubular member 318 is joined to the hub 316 by an adhesive bond that is impermeable to fluid. Those having ordinary skill in the art will understand that the tubular member 318 may joined to the hub 316 by other well known techniques such a threaded connection, a swage fitting and the like without departing from the scope of the invention.

The conduit coupling 320 has a first coupler 354 and a second coupler 356. The first coupler 354 is joined to the second end 352 of the tubular member 318 preferably by an adhesive bond that is impermeable to fluid. The second coupler 356 is preferably for being joined to the supply conduit 430. Those having ordinary skill in the art will understand from the present disclosure that the conduit coupling 320 could be adapted for joining to structures other than the supply conduit 430 without departing from the scope and intent of the present invention. For example, an alternate coupler 320' having a first seal 358 for sealably joining to a cable 430' suitable for underground installation could be joined to the second end 352 of the tubular member 318. The artisan will also understand that the conduit coupling 320 could have a seal for preventing the entry of fluid into the passageway 302.

Preferably, the receptacle assembly 300 has an adapter plate 360 that has a second seal 362. The adapter plate 360 is removably, sealably attached to the flange 314 and is configured for providing access to the electrical device 410 and for releasably supporting a cover plate (not shown). Still further, the receptacle assembly 300 includes a mounting spacer 364 removably attachable to the tubular member 318 and insertable in the second cavity opening 230 for supporting the tubular member 318.

Another aspect of the present invention is a method for preparing a block 210 for receiving a receptacle assembly 300 having a passageway 302. The passageway 302 has a second longitudinal axis 304. A first portion 306 of the passageway 302 has an outer surface 330 having a first shape generally corresponding to a shape of an outer surface of a body formed by the intersection of a first cylinder 331 (partially shown in phantom) with a second cylinder 333 (partially shown in phantom shown). The first cylinder 331 has a third longitudinal axis 332. The second cylinder 333 has a fourth longitudinal axis 334. The third longitudinal axis 332 is coaxial with the second longitudinal axis 304 of the passageway 302. The fourth longitudinal axis 334 is generally parallel to and spaced a second distance 336 from the third longitudinal axis 332. A second portion 308 of the passageway 302 has a generally circular cross sectional shape. The block 210 has a first side 212 and a second side 214 opposed to and spaced a first distance 222 from the first side 212. The first side 212 has a first exterior surface 218 and a first interior surface 220. The second side 214 has a second exterior surface 224 and a second interior surface 226. A cavity 216 extends from the first interior surface 220 to the second interior surface 226.

The method comprises at least the following three steps. One step is drilling through the first side 212 of the block 210 a first circular opening having a sixth longitudinal axis that is coaxial with the second longitudinal axis 304 of the passageway 302. Another step is drilling through the first side 212 of the block 210 a second circular opening having a seventh longitudinal axis corresponding to the fourth longitudinal axis 334 of the second cylinder 333. The first and second circular openings overlap to form the first cavity opening 228. Another step is drilling through the second side 214 of the block, a third circular opening having an eighth longitudinal axis coaxial with the sixth longitudinal axis of the first circular opening. The third circular opening forms the second cavity opening 320. Preferably, the first and second circular openings have the same diameter and the third circular opening has a diameter that is less than the diameter of the first and second circular openings. Those having ordinary skill in the art of preparing a block, such as the block 210, for receiving a receptacle assembly, such as the receptacle assembly 300, will understand from the disclosure that follows that although the order in which the first, second and third circular openings are drilled may be arbitrary, a preferred drilling order is to drill the first circular opening, then the third circular opening and then the second circular opening.

Figure 18:
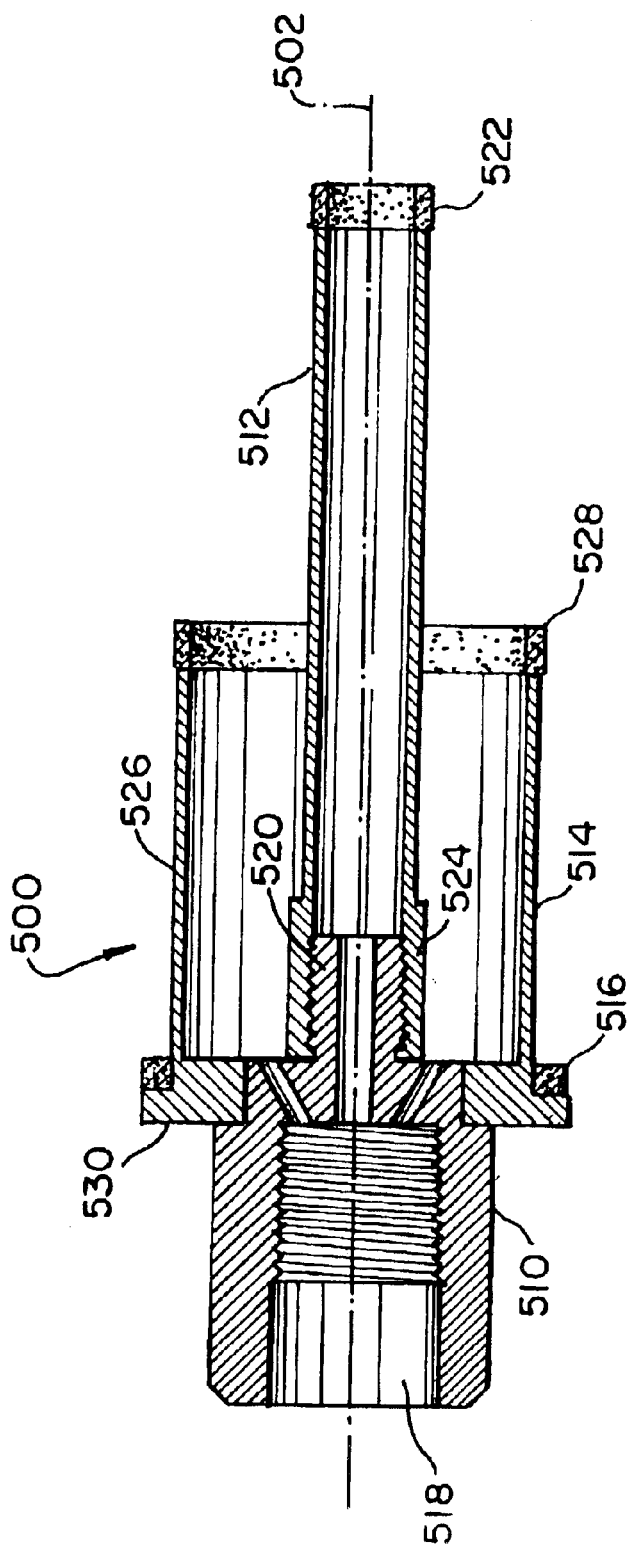
FIG. 18 is a cross-sectional view of a preferred embodiment of a three-step coring drill in accordance with the present invention.

The artisan will also understand from the present disclosure that preferably, the first, second and third circular openings are drilled with a three-step coring drill, such as the coring drill 500 shown in FIG. 18. The coring drill 500 has a longitudinal coring drill axis 502 and comprises a corer hub 510, a first corer 512, a second corer 514 and a counter-borer 516. The corer hub 510 is generally cylindrically shaped and has a first bore 518 for receiving a drive shaft (not shown) of a driver (not shown) well known in the block fabrication art for rotating the corer hub 510 about the coring drill axis 502. The corer hub 510 has an externally threaded shaft 520 for mounting the first corer 512. The first corer 512 is cylindrical in shape and has a first coring end 522 and an internally threaded mounting end 524 for being removably attached to the threaded shaft 520 of the corer hub 510. The second corer 514 has a cylindrical-shape second corer body 526 that is coaxial with the first corer 512 and has a diameter that is greater than the diameter of the first corer 512. The second corer body 526 has a second coring end 528 and a second corer flange 530 spaced from the second coring end 528. The second corer flange 530 is integral with the second corer body 526, is annular in shape and has an outer diameter that is greater than the diameter of the second corer body 526. The second corer 514 is fixedly attached by the second corer flange 530 to the corer hub 510 for rotation therewith. The counter borer 516 is annular in shape and is integral with the outer portion of the second corer flange 530. The first coring end 522, the second coring end 528 and the counter borer 516 preferably have an abrasive surface formed by abrasives such as diamond or cubic boron nitride.

Preferably, the first, second, and third circular openings are drilled in the block 210 by a method that comprises at least the steps discussed below.

A first step is drilling a pilot bore through the first side 212 of the block 210. Preferably the pilot bore is drilled with the first-step corer 512 of a three-step coring drill, such as the coring drill 500 shown in FIG. 18. The pilot bore has a sixth longitudinal axis corresponding to the second longitudinal axis 304 of the passageway 302. Another step is extending the first-step corer 512 through the pilot bore to the second interior surface 226 of the second side 214 of the block 210 and drilling with the first-step corer 512 the second cavity opening 230 through the second side 214 of the block 210. Another step is extending the first-step corer 512 through the second cavity opening 230 and drilling with the second-step corer 514 of the three-step coring drill 500, a first circular opening through the first side of the block. Still another step is extending the second-step corer 514 through the first circular opening and drilling with the third-step counter-borer 516 of the three-step coring drill 500 a first counter bore in the first side 212 of the block 210. The next step is withdrawing the three-step coring drill 500 from the block 210 and removing the first-step corer 512 from the three-step coring drill 500. The next step is drilling with the second-step corer 514 a second circular opening through the first side 212 of the block 210, the second circular opening having a seventh longitudinal axis corresponding to the fourth longitudinal axis. The next step is extending the second-step corer 514 through the second circular opening and drilling with the third-step counter-borer 516 a second counter bore in the first side 212 of the block 210. The last step is withdrawing the three-step core drill 500 from the block 210.

In use, after the block 210 has been prepared for receiving the receptacle assembly 300, the receptacle assembly 300 is partially inserted in the first cavity opening 228 of the block 210. An adhesive is applied to the mounting surface 340 of the flange 314 and the receptacle assembly is further inserted into the first cavity opening 228 until the mounting surface abuts the counter bore 234 and the receptacle assembly is secured to the block 210 by the adhesive. The mounting spacer 364 is slideably positioned on the tubular member 318 so that the mounting spacer 364 provides support for the tubular member 318 within the second cavity opening 230. In this condition, the block 210 is suitable for placement in various stone or masonry structures and for coupling with a supply conduit 430 for receiving a length of an electrical conductor 420 extending therefrom and providing an impermeable passageway 302 for the electrical conductor 420 through the stone or masonry structure to an electrical device 410 insertable in the enclosure 312 of the receptacle assembly 300.

Referring to FIGS. 19–22, there is shown a fourth preferred embodiment of the integrated electrical receptacle system, generally designated 900, and hereinafter referred to as the "receptacle assembly" 900 in accordance with the present invention. The receptacle assembly 900 is for receiving and attaching to a support, such as the first side 212 of the block 210 shown in FIG. 16, an electrical device connectable to an electrical conductor, such as the electrical device 410 and cable 430' shown in FIG. 15. The receptacle assembly 900 comprises an enclosure 902, a first mount 904 connected to the enclosure 902 for attaching the receptacle assembly to the support and a second mount 906 connected to the enclosure 902 for securing the electrical conductor to the enclosure 902.

The enclosure 902 has a sidewall 912 with an outer surface 914 having a shape generally corresponding to a shape of an outer surface of a body formed by the intersection of a first cylinder eccentric to a second cylinder. The enclosure 902 has a first opening 916 for receiving the electrical device and a second opening 918 for receiving the electrical conductor.

Figure 19:
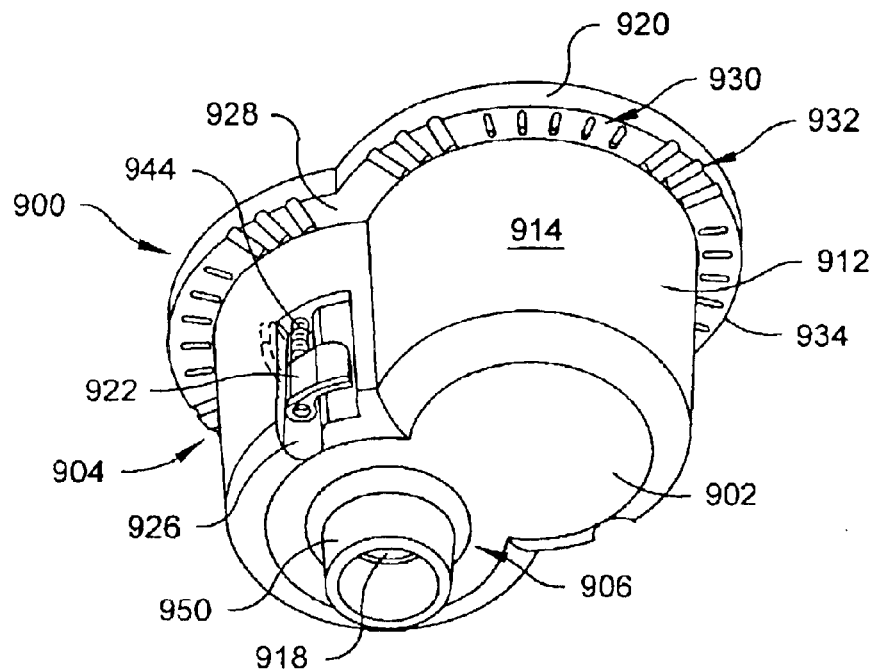
FIG. 19 is bottom perspective view of a fourth embodiment of the receptacle assembly in accordance with the present invention.
Figure 20:
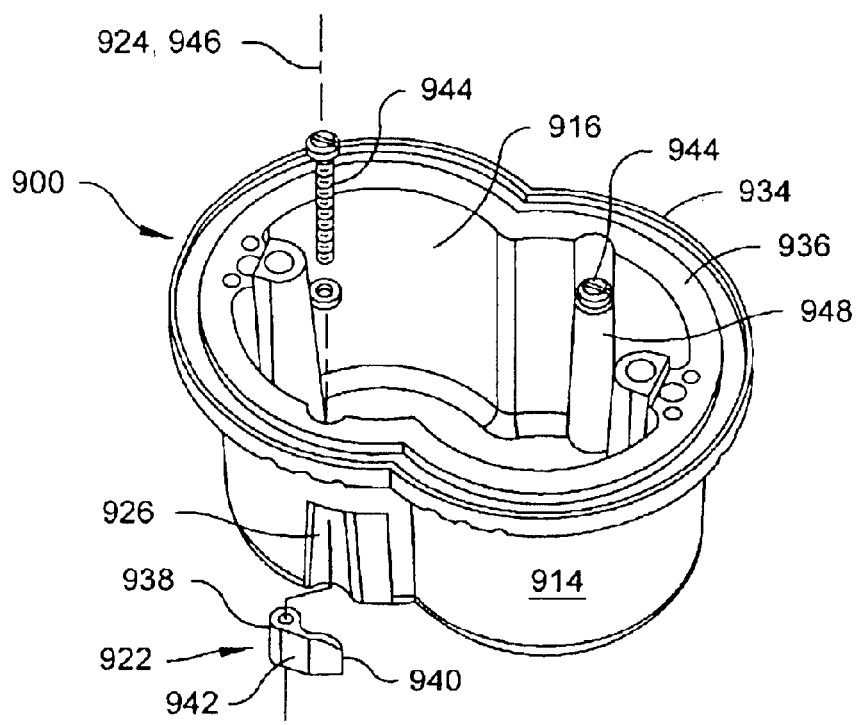
FIG. 20 is top perspective partially exploded view of the receptacle assembly of FIG. 19.
Figure 21:
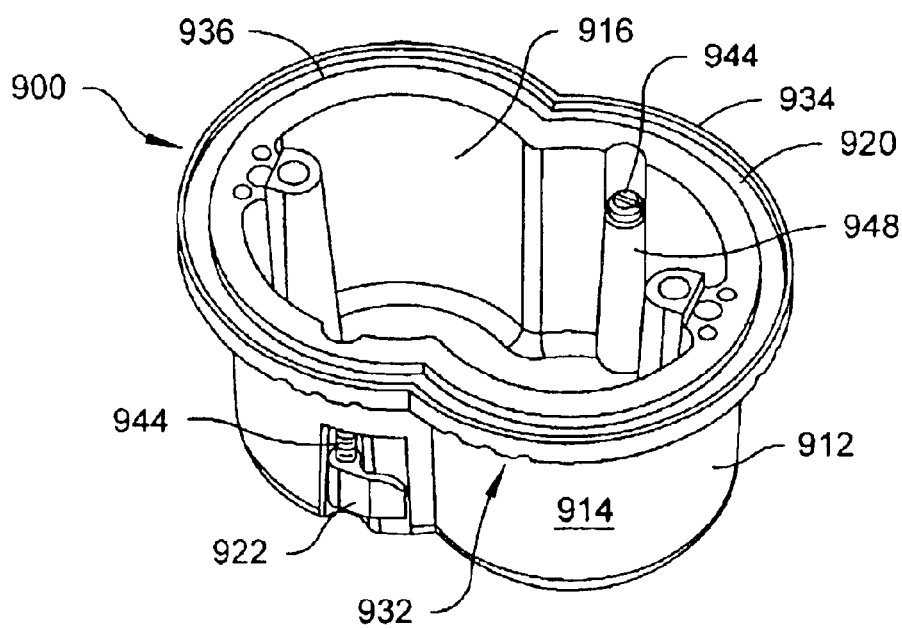
FIG. 21 is top perspective view of the receptacle assembly of FIG. 19 showing the retainer in the retracted and disengaged position.
Figure 22:
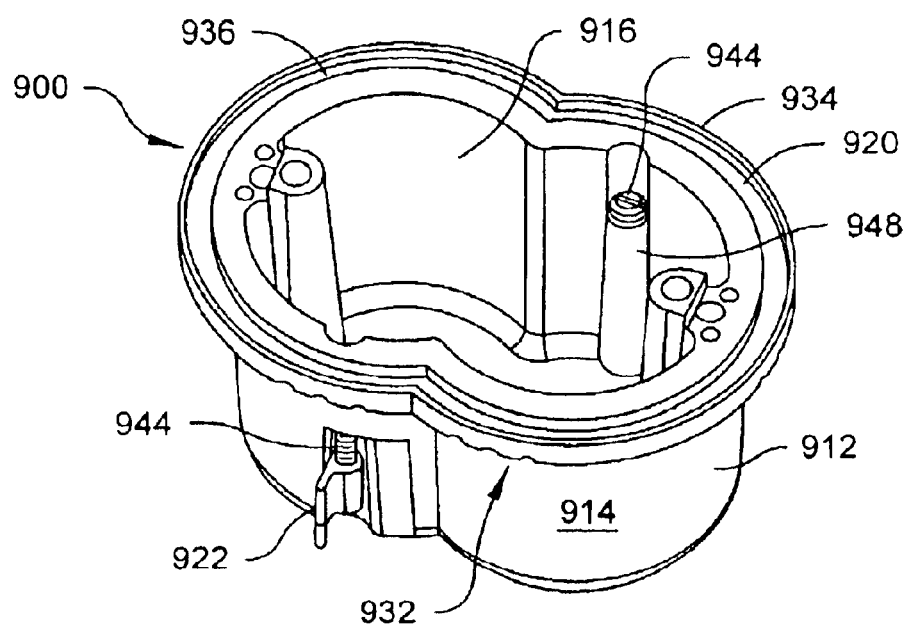
FIG. 22 is top perspective view of the receptacle assembly of FIG. 19 showing the retainer in the extended and disengaged positions.

The first mount 904 comprises a flange 920 and a retainer 922. The flange 920 circumscribes the outer surface 914 of the sidewall 912 of the enclosure 902 proximal to the first opening 916. The retainer 922 is pivotably connected to the enclosure 902 and is pivotable about a retainer axis 924 between a retracted position (FIG. 21) and an extended position (FIG. 22) and movable along the retainer axis 924 between a disengaged position distal to the flange 920 and an engaged position proximal to the flange 920. Preferably, the retainer 922 is entirely within a recess 926 in the outer surface 914 of the sidewall 912 of the enclosure 902 when the retainer 922 is in the retracted and disengaged positions (FIG. 19). The first mount 904 secures the receptacle assembly 900 to the support when the support is positioned between the flange 920 and the retainer 922 and the retainer 922 is in the extended and engaged positions, as shown in phantom in FIG. 19.

Preferably, the flange 920 has a mounting surface 928 for abutting the support. The mounting surface 928 has at least one adhesive slot 930 and at least one drainage slot 932. The flange 920 has a outer perimeter 934 and an outwardly facing surface 936 configured for releasably supporting a cover plate (not shown) configured to cover and seal the first opening 916. The outer perimeter 934 of the flange 920 preferably has a generally rectilinear-shape. However, the shape of the outer perimeter 934 can have a wide variety of well known geometric shapes or specialty shapes such as the figure-eight-like shape shown in FIGS. 19–24.

The retainer 922 has a retainer hub 938. A lobe 940 extends from the retainer hub 938. The lobe 940 has an outer surface 942 preferably with a shape substantially the same as a portion of the outer surface 914 of the sidewall 912 of the enclosure 902. An actuator 944 connects the retainer 922 to the enclosure 902. The actuator 944 has an actuator axis coincident 946 with the retainer axis 924. The actuator 944 is threadedly connected to retainer hub 938 and is rotatably within a boss 948 integral with the enclosure 902. A first rotation of the actuator 944 pivots the retainer between the retracted position and the extended position. Interference with the wall of the recess 926 in the enclosure 902 serves as a stop preventing further pivoting of the retainer 922 upon further rotation of the actuator 944. A second rotation of the actuator 944 moves the retainer 922 along the actuator axis 946 from the disengaged position toward the engaged position.

The second mount 906 preferably is a conduit hub 950 formed as an extension of a portion of the enclosure 902 and is configured to provide the second opening 918 in the enclosure 902. The conduit hub 950 is further configured to receive and secure to the enclosure 902 a conduit and to receive a an electrical conductor passing through the conduit, such as the supply conduit 430 or cable 430' and the electrical conductors 420, 420' extending therefrom, as shown in FIG. 15.

Figure 23:
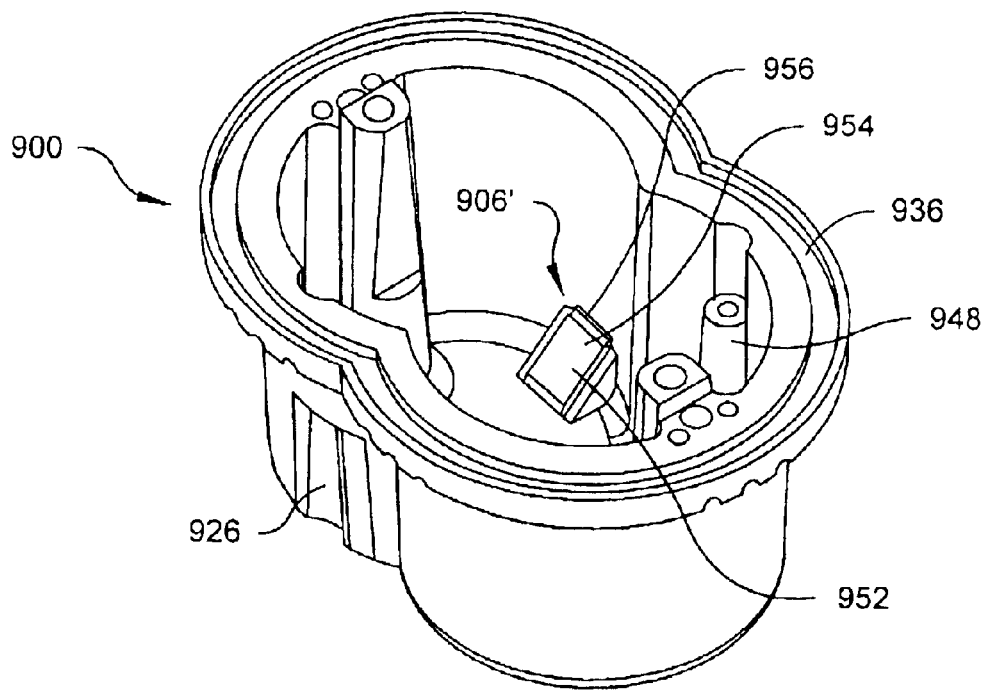
FIG. 23 is top perspective view of a portion of the fifth preferred embodiment of the receptacle assembly in accordance with the present invention.
Figure 24:
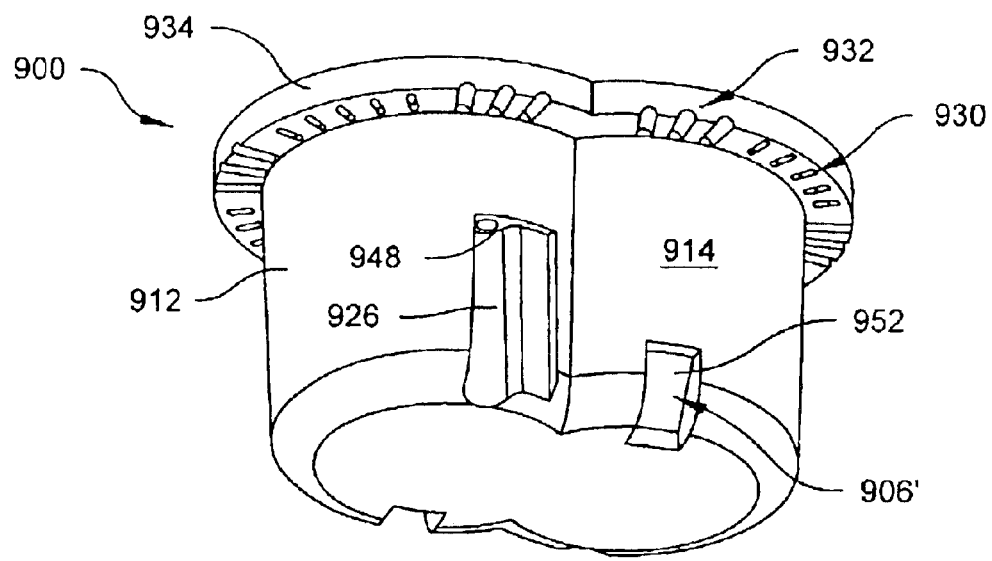
FIG. 24 is a bottom perspective view of the receptacle assembly of FIG. 23.

Referring to FIGS. 23–24, alternatively, the second mount 906' comprises a clamp 952 proximal to the second opening 918 of the enclosure 902 for securing the electrical conductor to the enclosure 902. Preferably, but not necessarily, the electrical conductor is a non-metallic sheathed electric cable, such as a cable commonly referred to as Romex® (a registered trademark of General Cable Industries, Inc.) and the clamp 952 comprises a grip 954 connected by a hinge 956 to the enclosure 902 for engaging the cable. Upon insertion of the electrical conductor through the second opening 918, the grip engages the cable and resists withdrawal of the cable.

The second mount 906, 906' is not limited to the retainer hub 950 configuration shown in FIG. 19 of the grip 954 and hinge 956 configuration shown in FIGS. 23 and 24. Referring to FIG. 15, for example, to accommodate a variety of electrical conductors 420, 420' and cables 430' and supply conduits 430, the present invention provides for an alternate second mount that is integral with the unitary wall 322 forming the chamber 324 for containing the electrical device 410 and configured to provide a second opening 346 for receiving a portion of the length of the electrical cable (or conductors) 420, and to connect the electrical conductors 420 to the unitary wall 322. The alternate second mount comprises a hub 316, a tubular member 318, and a conduit coupling 320. The hub 316 is integral with the unitary wall 322 and provides the second chamber opening 346. The tubular member 318 has a first end 350 and a second end 352 and extends from the hub 316 to the second cavity opening 346. The first end 350 is joined to the hub 316. The conduit coupling 320 has a first coupler 354 and a second coupler 356. The first coupler 354 is joined to the second end 352 of the tubular member 318. The second coupler 356 is for being joined to the supply conduit 430.

The receptacle assembly 900 can be secured to any support structure having a correspondingly configured cavity providing access to an electrical conductor. The electrical conductor is inserted into the second opening 918 in the enclosure and secured to the enclosure by the second mount 906, 906'. The manner is which the conductor is secured to the enclosure 918 depends on the configuration of the conductor and second mount 906, 906'. For example, if the second mount 906 has a hub like configuration and the electrical conductor is in a conduit, the conduit is typically adhesively connected to the hub. If the second mount 906' has a clamp-like configuration and the electrical conductor is a non-metallic sheathed electric cable, the conductor is typically secured to the enclosure by the grasping action of the clamp.

After the electrical conductor has been inserted in the enclosure 902, the receptacle assembly 900 is partially inserted in a cavity in the support, such as the cavity 216 in the block 210 as shown in FIG. 16, with the retainer 922 in the retracted and disengaged position. Adhesive is applied to the adhesive slots 930 of the flange 920 and the receptacle assembly 900 is further inserted into the cavity until the mounting surface 928 of the flange 920 abuts the support.

The receptacle assembly 900 is secured to the support by the first mount 902. TO secure the receptacle assembly to the support, the retainer actuator 944 is rotated to pivot the retainer 922 first to the disengaged and extended position in which the retainer lobe 940 extends outwardly beyond the outer surface 914 of the sidewall 912 of the enclosure 920. When the retainer 922 pivots sufficiently to strike the sidewall 912, further rotation of the actuator 944 moves the retainer 922 toward the support. Continued rotation of the actuator 944 causes the retainer 922 to abut the support and secure the receptacle assembly 900 to the support. Preferably, the receptacle assembly 900 has another first mount spaced from the first mount 902 that is similarly actuated to secure the receptacle assembly 900 to the support at another location.

Those skilled in the art will appreciate that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A receptacle assembly for receiving and attaching to a support an electrical device connectable to an electrical conductor, the receptacle assembly comprising:

an enclosure having a sidewall with an outer surface and an inner surface, the outer surface generally corresponding to a continuous outer surface formed by a portion of an outer surface of a first cylinder and a portion of an outer surface of a second cylinder, the first cylinder intersection the second cylinder, the inner surface generally corresponding to a continuous inner surface formed by a portion of the inner surface of the first cylinder and a portion of an inner surface of the second cylinder, the enclosure having a first opening for receiving the electrical device and a second opening for receiving the electrical conductor;

a retainer pivotably connected to the enclosure, the retainer pivotable about a retainer axis between a retracted position and an extended position and movable along the retainer axis between a disengaged position and an engaged position;

a first mount connected to the enclosure for attaching the receptacle assembly to the support; and a second mount connected to the enclosure for securing the electrical conductor to the enclosure.

2. The receptacle assembly according to claim 1, wherein the first mount comprises:

a flange circumscribing the outer surface of the sidewall of the enclosure proximal to the first opening;

whereby the first mount secures the receptacle assembly to the support when the support is positioned between the flange and the retainer and the retainer is in the extended and engaged positions.

3. The receptacle assembly according to claim 2, wherein the flange has a mounting surface for abutting the support, the mounting surface having at least one adhesive slot and at least one drainage slot.

4. The receptacle assembly according to claim 2, wherein the flange has a generally rectilinear-shaped outer perimeter.

5. The receptacle assembly according to claim 2, wherein the flange has an outwardly facing surface configured for releasably supporting a cover plate configured to cover the first opening.

6. The receptacle assembly according to claim 2, wherein the receptacle assemble further comprises a cover plate, and the flange has a mounting surface for abutting the support, a generally rectilinear-shaped outer perimeter, and an outwardly facing surface configured for releasably supporting the cover plate, the mounting surface having at least one adhesive slot and at least one drainage slot, the cover plate configured to seal the first opening.

7. The receptacle assembly according to claim 2, wherein the retainer is entirely within a recess in the outer surface of the sidewall of the enclosure when the retainer is in the retracted and disengaged positions.

8. The receptacle assembly according to claim 7, wherein the retainer has a retainer hub and a lobe extending from the retainer hub, the lobe having an outer surface with a shape substantially the same as a portion of the outer surface of the sidewall of the enclosure.

9. The receptacle assembly according to claim 8, wherein an actuator connects the retainer to the enclosure, the actuator having an actuator axis coincident with the retainer axis, the actuator threadedly connected to retainer hub and rotatably within a boss integral with the enclosure, and whereby a first rotation of the actuator pivots the retainer between the retracted position and the extended position and a second rotation of the actuator moves the retainer along the actuator axis from the disengaged position toward the engaged position.

10. A receptacle assembly for receiving and attaching to a support an electrical device connectable to an electrical conductor, the receptacle assembly comprising:

an enclosure having a sidewall with an outer surface and an inner surface, the outer surface generally corresponding to a continuous outer surface formed by a portion of an outer surface of a first cylinder and a portion of an outer surface of a second cylinder, the first cylinder intersection the second cylinder, the inner surface generally corresponding to a continuous inner surface formed by a portion of the inner surface of the first cylinder and a portion of an inner surface of the second cylinder, the enclosure having a first opening for receiving the electrical device and a second opening for receiving the electrical conductor;

a first mount connected to the enclosure for attaching the receptacle assembly to the support, the first mount comprising:

a flange circumscribing the outer surface of the sidewall of the enclosure proximal to the first opening, the flange having a mounting surface for abutting the support, a generally rectilinear-shaped outer perimeter, and an outwardly facing surface configured for releasably supporting a cover plate configured to seal the first opening, the mounting surface having at least one adhesive slot and at least one drainage slot, the cover plate configured to seal the first opening, and a retainer pivotably connected to the enclosure, the retainer pivotable about a retainer axis between a retracted position and an extended position and movable along the retainer axis between a disengaged position and an engaged position, the retainer being entirely within a recess in the outer surface of the sidewall of the enclosure when the retainer is in the retracted and disengaged positions, the retainer having a retainer hub and a lobe extending from the retainer hub, the lobe having an outer surface with a shape substantially the same as a portion of the outer surface of the sidewall of the enclosure, and an actuator connects the retainer to the enclosure, the actuator having an actuator axis coincident with the retainer axis, the actuator threadedly connected to hub and rotatably within a boss integral with the enclosure, a first rotation of the actuator pivoting the retainer between the retracted position and the extended position and a second rotation of the actuator moving the retainer along the actuator axis from the disengaged position toward the engaged position, whereby the first mount secures the receptacle assembly to the support when the support is positioned between the flange and the retainer and the retainer is in the extended and engaged positions; and a second mount connected to the enclosure for securing the electrical conductor to the enclosure.

11. The receptacle assembly according to claim 2, the second mount is a conduit hub formed as an extension of a portion of the enclosure and is configured to provide the second opening in the enclosure.

12. The receptacle assembly according to claim 2, wherein the second mount comprises a clamp proximal to the second opening.

13. The receptacle assembly according to claim 12, wherein the electrical conductor is a non-metallic sheathed electric cable and the clamp comprises a grip connected by a hinge to the enclosure, whereby the grip engages the cable when the cable is inserted through the second opening and resists a withdrawal of the cable.

14. A receptacle assembly for containing an electrical device and a length of a non-metallic sheathed electric cable to the electrical device, the receptacle assembly being mountable in a block having a first side and a second side, the first side having a first exterior surface and a first interior surface, the second side having a second exterior surface and a second interior surface, a cavity extending from the first interior surface to the second interior surface, the cavity having a first cavity opening in the first side and a second cavity opening in the second side, the receptacle assembly comprising:

an enclosure having a unitary wall forming a chamber for containing the electrical device, the unitary wall having an outer surface and an inner surface, the outer surface generally corresponding to a continuous outer surface formed by a portion of an outer surface of a first cylinder and a portion of an outer surface of a second cylinder, the first cylinder intersecting the second cylinder, the inner surface generally corresponding to a continuous inner surface formed by a portion of the inner surface of the first cylinder and a portion of an inner surface of the second cylinder, the unitary wall having a first chamber opening for providing access to the electrical device, the first chamber opening corresponding to the first cavity opening;

a first mount connected to the unitary wall for securing the enclosure to the block, the first mount comprising a flange circumscribing the outer surface of the unitary wall proximal to the first chamber opening and a retainer pivotably connected to the unitary wall, the retainer pivotable about a retainer axis between a retracted position and an extended position and movable along the retainer axis between a disengaged position and an engaged position, whereby the first mount secures the enclosure to the block when the first side of the block is positioned between the flange and the retainer and the retainer is in the extended and engaged positions; and a second mount integral with the unitary wall and configured to provide a second chamber opening for receiving a portion of the length of the electrical cable, and to connect the electrical cable to the unitary wall.

15. The receptacle assembly according to claim 14, wherein the retainer is entirely within a recess in the outer surface of the unitary wall when the retainer is in the retracted and disengaged positions.

16. A receptacle assembly for containing an electrical device and a length of a non-metallic sheathed electric cable extending from a supply conduit to the electrical device, the receptacle assembly being mountable in a block having a first side and a second side, the first side having a first exterior surface and a first interior surface, the second side having a second exterior surface and a second interior surface, a cavity extending from the first interior surface to the second interior surface, the cavity having a first cavity opening in the first side and a second cavity opening in the second side, the receptacle assembly comprising:

an enclosure having a unitary wall forming a chamber for containing the electrical device, the unitary wall having a first chamber opening for providing access to the electrical device, the first chamber opening corresponding to the first cavity opening;

a first mount connected to the unitary wall for securing the enclosure to the block, the first mount comprising a flange circumscribing the outer surface of the unitary wall proximal to the first chamber opening and a retainer pivotably connected to the unitary wall, the retainer pivotable about a retainer axis between a retracted position and an extended position and movable along the retainer axis between a disengaged position and an engaged position, the retainer entirely within a recess in the outer surface of the unitary wall when the retainer is in the retracted and disengaged position, whereby the first mount secures the enclosure to the block when the first side of the block is positioned between the flange and the retainer and the retainer is in the extended and engaged positions; and a second mount integral with the unitary wall and configured to provide a second chamber opening for receiving a portion of the length of the electrical cable, and to connect the electrical cable to the unitary wall, the second mount comprising a hub, a tubular member, and a conduit coupling, the hub integral with the unitary wall and providing the second chamber opening, the tubular member having a first end and a second end and extending from the hub to the second cavity opening, the first end being joined to the hub, the conduit coupling having a first coupler and a second coupler, the first coupler being joined to the second end of the tubular member, the second coupler for being joined to the supply conduit, whereby the receptacle assembly forms a passageway within the cavity, the passageway extending from the first exterior surface of the block to the second exterior surface of the block.

17. The receptacle assembly according to claim 16, wherein the passageway is impermeable to fluid in the block.

* * * * *